United States Patent
Lee et al.

(10) Patent No.: US 9,417,781 B2
(45) Date of Patent: Aug. 16, 2016

(54) MOBILE TERMINAL AND METHOD OF CONTROLLING THE SAME

(75) Inventors: Kunwoo Lee, Seoul (KR); Hanwoong Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 228 days.

(21) Appl. No.: 13/480,642

(22) Filed: May 25, 2012

(65) Prior Publication Data

US 2013/0176298 A1    Jul. 11, 2013

(30) Foreign Application Priority Data

Jan. 10, 2012 (KR) .......................... 10-2012-0002880

(51) Int. Cl.
| | | |
|---|---|---|
| G06T 11/00 | (2006.01) | |
| G06F 3/0488 | (2013.01) | |
| G06F 3/0483 | (2013.01) | |
| G06F 3/0485 | (2013.01) | |

(52) U.S. Cl.
CPC ............ G06F 3/0488 (2013.01); G06F 3/0483 (2013.01); G06F 3/0485 (2013.01)

(58) Field of Classification Search
None
See application file for complete search history.

(56) References Cited

U.S. PATENT DOCUMENTS

| | | | | | |
|---|---|---|---|---|---|
| 6,166,736 | A * | 12/2000 | Hugh | ............................. | 715/798 |
| 6,411,292 | B1 * | 6/2002 | Cook et al. | .................... | 345/419 |
| 8,302,031 | B1 * | 10/2012 | Sang | ............... | 715/848 |
| 8,812,985 | B2 * | 8/2014 | Akella | ................. | G06F 3/0482 |
| | | | | | 345/647 |
| 2002/0080182 | A1 * | 6/2002 | Negishi et al. | ................ | 345/781 |
| 2008/0062141 | A1 | 3/2008 | Chandhri | ...................... | 345/173 |
| 2008/0270931 | A1 * | 10/2008 | Bamford | ................ | G06F 3/016 |
| | | | | | 715/777 |
| 2009/0007014 | A1 * | 1/2009 | Coomer et al. | ............... | 715/830 |
| 2009/0064055 | A1 * | 3/2009 | Chaudhri et al. | ............ | 715/863 |
| 2009/0109184 | A1 * | 4/2009 | Kim et al. | ..................... | 345/173 |
| 2009/0150775 | A1 | 6/2009 | Miyazaki et al. | | |
| 2009/0288043 | A1 * | 11/2009 | Willis | ......................... | 715/859 |
| 2010/0077344 | A1 * | 3/2010 | Gaffney et al. | ............... | 715/788 |
| 2010/0211872 | A1 | 8/2010 | Rolston et al. | | |
| 2011/0010659 | A1 * | 1/2011 | Kim | ..................... | G06F 3/0485 |
| | | | | | 715/784 |
| 2011/0022957 | A1 * | 1/2011 | Lee | .............................. | 715/702 |
| 2011/0093778 | A1 | 4/2011 | Kim et al. | ..................... | 715/702 |
| 2011/0102421 | A1 * | 5/2011 | Minamino et al. | ............ | 345/419 |
| 2011/0157047 | A1 * | 6/2011 | Nakagawa | .................... | 345/173 |
| 2011/0191344 | A1 * | 8/2011 | Jin | .......................... | G06F 17/30 |
| | | | | | 707/739 |

(Continued)

FOREIGN PATENT DOCUMENTS

WO    WO 2011/094855 A1    8/2011

OTHER PUBLICATIONS

Visual Tabs, "Visual Tabs Extension in Google Chrome," Jul. 2010 [retrieved from internet Jul. 20, 2015], <URL:https://www.youtube.com/watch?v=sWcFPlxJcoM>.*

(Continued)

*Primary Examiner* — Andrew G Yang
(74) *Attorney, Agent, or Firm* — KED & Associates, LLP

(57) ABSTRACT

A mobile terminal and a method of controlling the same are provided. When a touch input of starting from a predefined area on a touch screen is received, the mobile terminal scrolls at least one page including at least one item while sequentially exposing on the touch screen, but scrolls by giving a three-dimensional effect to each page. Accordingly, accessibility and utility of an item providing in the mobile terminal can be improved.

8 Claims, 43 Drawing Sheets

(56) References Cited

U.S. PATENT DOCUMENTS

| | | | |
|---|---|---|---|
| 2011/0260997 A1* | 10/2011 | Ozaki | 345/173 |
| 2011/0296351 A1* | 12/2011 | Ewing et al. | 715/841 |
| 2012/0131495 A1* | 5/2012 | Goossens et al. | 715/782 |
| 2012/0159364 A1 | 6/2012 | Hyun | |
| 2012/0166987 A1* | 6/2012 | Kang et al. | 715/765 |
| 2012/0304133 A1* | 11/2012 | Nan et al. | 715/863 |
| 2013/0145290 A1* | 6/2013 | Weber et al. | 715/760 |

OTHER PUBLICATIONS

Iwaya, "Visually Browse Through Your Open Tabs in Google Chrome," Mar. 2010 [retrieved from Internet Jul. 20, 2015], <URL:http://www.howtogeek.com/howto/12026/visually-browse-through-your-open-tabs-in-google-chrome/>.*

European Search Report dated Apr. 24, 2013 issued in Application No. 12 00 5634.

* cited by examiner

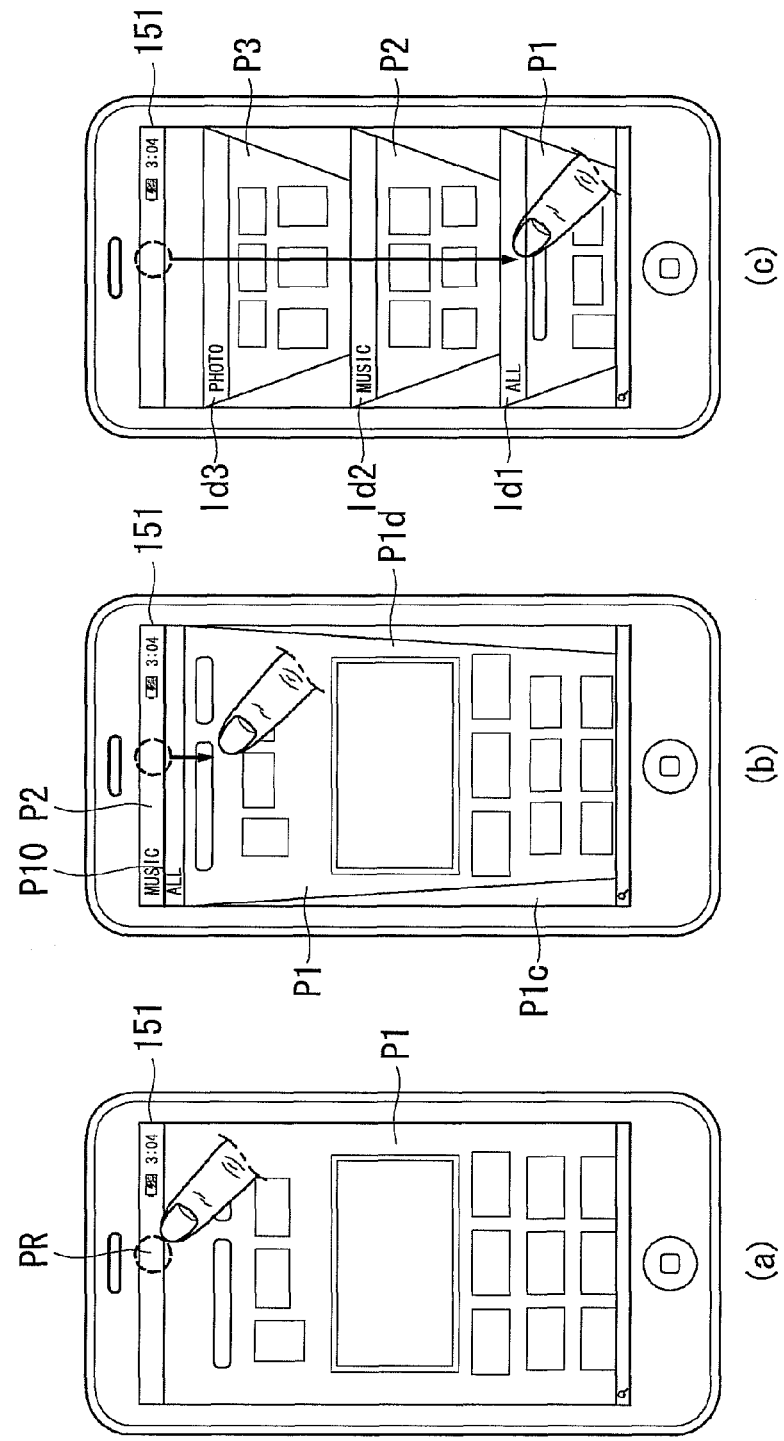

FIG. 27c

|  | Indicator |  |
|---|---|---|
| 21 — | Facebook | Register new message |
| 22 — | Twitter | New follower |
| 23 — | Message | Two new messages |
|  | ⋮ |  |

МОBILE TERMINAL AND METHOD OF CONTROLLING THE SAME

CROSS-REFERENCE TO RELATED PATENT APPLICATIONS

Pursuant to 35 U.S.C. 119(a), this application claims the benefit of earlier filing date and right of priority to Korean Application No. 10-2012-0002880, filed on Jan. 10, 2012, the contents of which is incorporated by reference herein in its entirety.

FIELD OF THE INVENTION

The present invention relates to a mobile terminal and a method of controlling the same, and more particularly, to a mobile terminal and a method of controlling the same that can provide a user interface for more efficiently displaying an item in the mobile terminal.

RELATED ART

As hardware technology and software technology related to various electronic devices including a mobile terminal remarkably develops, mobile terminals provide or store very various functions and information. Such various functions and information are generally provided in an application form.

However, the various functions and information each generally provide an independent application, and the application is arranged at a predetermined page and is viewed through a touch screen.

Because a size of the touch screen has a limitation, when displaying a plurality of items, inconvenience of complicated menu manipulation or frequent screen conversion is caused.

Accordingly, a technical means and a user interface that efficiently display a plurality of items in a display unit and that can use this are urgently requested.

SUMMARY

An aspect of the present invention is to provide a mobile terminal and a method of controlling the same that can more efficiently provide a plurality of items on a touch screen by giving a three-dimensional effect to a 2D page in which a plurality of item are conventionally displayed.

Another aspect of the present invention is to provide a user interface that can improve accessibility and utility to a plurality of items provided through a mobile terminal.

In an aspect, a mobile terminal includes: a touch screen; and a controller for controlling to display a page including at least one item on the touch screen and for controlling a display of a scrolled page when a scroll input of starting from a predefined area of the page on the touch screen is received, wherein the controller controls to change and display a slope of the scrolled page and a depth level of an inclined side surface of the page according to a scrolled distance.

In another aspect, a mobile terminal includes: a touch screen; and a controller for controlling a predefined plurality of pages to be sequentially spread on the touch screen while being inclined along a drag path and controlling to display each scrolled page in a three-dimensional shape as a length of an inclined surface is changed while each page is spread, when a drag input of starting from a predefined area on the touch screen is received.

In another aspect, a method of controlling a mobile terminal includes: displaying a page including at least one item on a touch screen; receiving a scroll input of starting from a predefined area of the page on the touch screen; and changing and displaying a slope of the page and a depth level of an inclined side surface of the page according to a scrolled distance.

In another aspect, a method of controlling a mobile terminal includes: receiving a drag input of starting from a boundary surface of a touch screen; sequentially spreading each of a predefined plurality of pages on the touch screen while inclining along a drag path; and displaying each scrolled page in a three-dimensional shape by changing a length of an inclined surface while each page is spread.

The detailed matters of the embodiments will be included in the detailed description and the drawings.

ADVANTAGES

A mobile terminal and a method of controlling the same according to an embodiment of the present invention have following effects.

According to the present invention, by giving a three-dimensional effect to a 2D page in which a plurality of items are conventionally displayed, the plurality of items can be more efficiently provided on a touch screen.

Further, according to the present invention, a user interface that can improve accessibility and utility to a plurality of items provided through the mobile terminal can be provided.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

FIG. 5 illustrates an example of a mobile terminal screen illustrating a method of controlling a mobile terminal shown in FIG. 3.

FIGS. 27A to 27C are diagrams illustrating an example of reconfiguring an event occurred in a plurality of pages according to an embodiment shown in FIG. 26.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
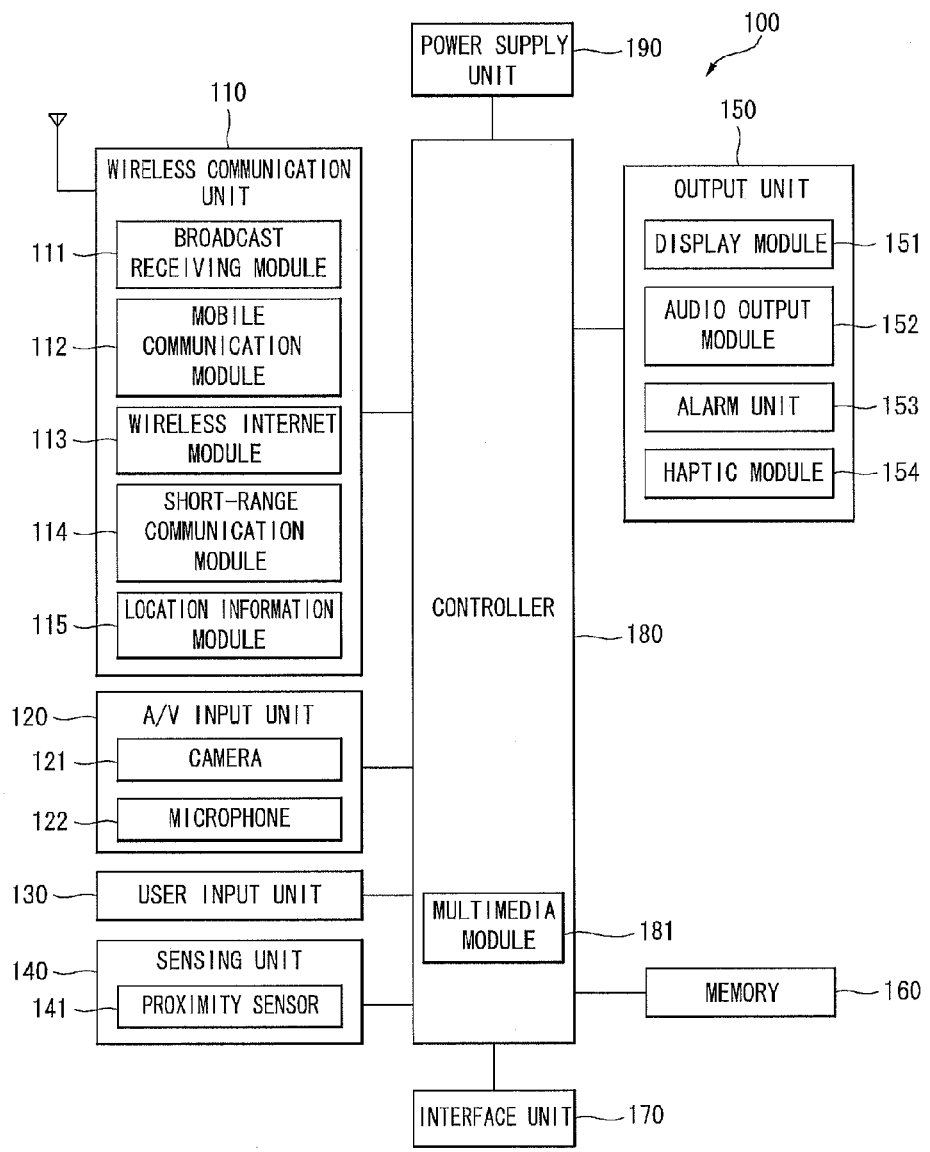
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but implementing all of the illustrated components is not a requirement. Greater or fewer components may alternatively be implemented.

In addition, the wireless communication unit 110 generally includes one or more components allowing radio communication between the mobile terminal 100 and a wireless communication system or a network in which the mobile terminal is located. For example, in FIG. 1, the wireless communication unit includes at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®), the integrated services digital broadcast-terrestrial (ISDB-T) system, etc.

The broadcast receiving module 111 can also be configured to be suitable for all broadcast systems that provide a broadcast signal as well as the above-mentioned digital broadcast systems. In addition, the broadcast signals and/or broadcast-associated information received via the broadcast receiving module 111 may be stored in the memory 160.

In addition, the mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

Also, the location information module 115 is a module for checking or acquiring a location or position of the mobile terminal. The location information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 1, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored in the memory 160 or transmitted via the wireless communication unit 110. Two or more cameras 121 may also be provided according to the configuration of the mobile terminal.

In addition, the microphone 122 can receive sounds via a microphone in a phone call mode, a recording mode, a voice recognition mode, and the like, and can process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

Also, the user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

Further, the sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. In FIG. 1, the sensing unit 140 also includes a proximity sensor 141.

In addition, the output unit 150 is configured to provide outputs in a visual, audible, and/or tactile manner. In the example in FIG. 1, the output unit 150 includes the display unit 151, an audio output module 152, an alarm unit 153, a haptic module 154, and the like. In more detail, the display unit 151 can display information processed in the mobile terminal 100. For example, when the mobile terminal 100 is in a phone call mode, the display unit 151 can display a User Interface (UI) or a Graphic User Interface (GUI) associated with a call or other communication.

The display unit 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

Further, the mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 can function as both an input device and an output device. The touch sensor may have a form of a touch film, a touch sheet, a touch pad, and the like.

Further, the touch sensor may be configured to convert pressure applied to a particular portion of the display unit 151 or a change in the capacitance or the like generated at a particular portion of the display unit 151 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display unit 151 has been touched.

With reference to FIG. 1, the proximity sensor 141 may be disposed within or near the touch screen. In more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

Further, the audio output module 152 can convert and output as sound audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack.

In addition, the alarm unit 153 can output information about the occurrence of an event of the mobile terminal 100. Typical events include call reception, message reception, key signal inputs, a touch input etc. In addition to audio or video outputs, the alarm unit 153 can provide outputs in a different manner to inform about the occurrence of an event. For example, the alarm unit 153 can provide an output in the form of vibrations. The video signal or the audio signal may be also output through the display unit 151 or the audio output module 152.

In addition, the haptic module 154 generates various tactile effects the user may feel. One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Further, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Also, the interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected with an external cradle, the interface unit 170 can also serve as a passage to allow power from the cradle to be supplied therethrough to the mobile terminal 100 or serve as a passage to allow various command signals input by the user from the cradle to be transferred to the mobile terminal therethrough. Various command signals or power input from the cradle may operate as signals for recognizing that the mobile terminal is properly mounted on the cradle.

In addition, the controller 180 controls the general operations of the mobile terminal. For example, the controller 180 performs controlling and processing associated with voice calls, data communications, video calls, and the like. In the example in FIG. 1, the controller 180 also includes a multimedia module 181 for reproducing multimedia data. The multimedia module 181 may be configured within the controller 180 or may be configured to be separated from the controller 180. The controller 180 can also perform a pattern recognition processing to recognize a handwriting input or a picture drawing input performed on the touch screen as characters or images, respectively.

Also, the power supply unit 190 receives external power or internal power and supplies appropriate power required for operating respective elements and components under the control of the controller 180. Further, various embodiments described herein may be implemented in computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2:
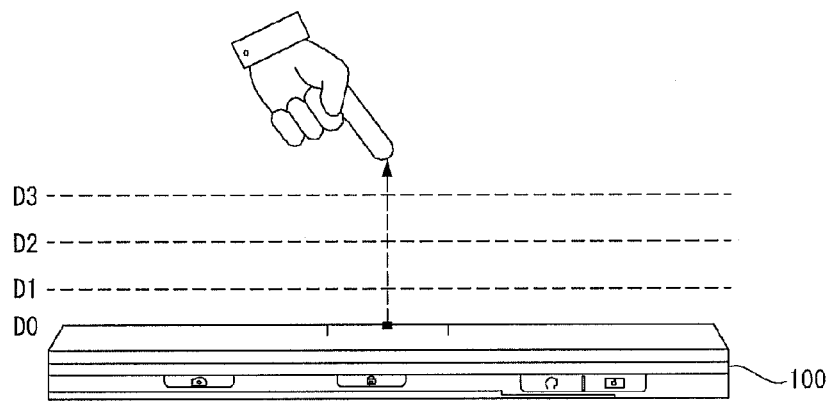
FIG. 2 is a conceptual diagram illustrating a proximity depth of the proximity sensor.
Figure 3:
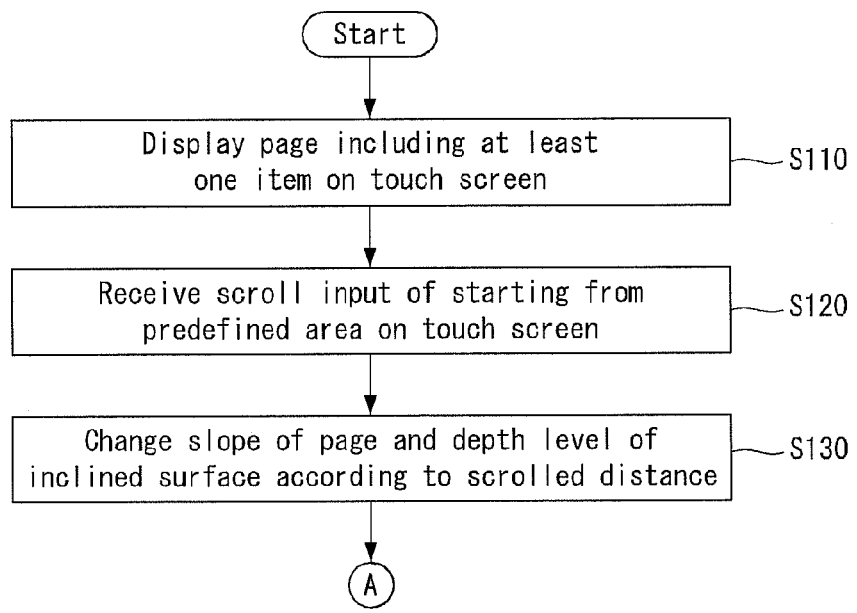
FIG. 3 is a flowchart illustrating a method of controlling a mobile terminal according to an embodiment of the present invention.

Next, FIG. 2 is a conceptual diagram illustrating a proximity depth of the proximity sensor 141. As shown in FIG. 3, when a pointer such as the user's finger, a pen, or the like, approaches the touch screen, the proximity sensor 141 disposed within or near the touch screen detects it and outputs a proximity signal. The proximity sensor 141 may also be configured to output a different proximity signal according to the distance (referred to as a 'proximity depth', hereinafter) between the closely touched pointer and the touch screen.

FIG. 2 also shows the section of the touch screen with the proximity sensor 141 for detecting, for example, three proximity depths. The proximity sensor 141 may detect three or less or four or more proximity depths. In more detail, when the pointer is fully brought into contact with the touch screen d0, this position is recognized as a contact touch. When the pointer is positioned to be spaced apart by shorter than a distance d1 on the touch screen, this position is recognized as a proximity touch with a first proximity depth.

If the pointer is positioned to be spaced apart by the distance longer than the distance d1 but shorter than a distance d2 on the touch screen, this position is recognized as a proximity touch with a second proximity depth. Also, if the pointer is positioned to be spaced apart by the distance longer than the distance d2 but shorter than a distance d3, this position is recognized as a proximity touch with a third proximity depth. If the pointer is positioned to be spaced apart by longer than the distance d3 on the touch screen, this position is recognized that the proximity touch has been released.

Accordingly, the controller 180 can recognize the proximity touches as various input signals according to the proximity depths and proximity positions of the pointer, and control various operations according to the various input signals.

FIG. 3 is a flowchart illustrating a method of controlling a mobile terminal according to an embodiment of the present invention. FIGS. 4A to 4E are diagrams illustrating a concept that provides and displays a three-dimensional effect to at least one page according to an embodiment of the present invention.

A method of controlling a mobile terminal according to an embodiment of the present invention can be performed in the mobile terminal 100 described with reference to FIGS. 1 and 2.

Referring to FIG. 3, the controller 180 controls to display a page including at least one item on the touch screen 151 (S110).

The item may include multimedia contents such as a still image and a moving picture. Further, the item may include at least one of a data list, a text, and an application for displaying at least one data.

The controller 180 arranges the at least one item in a predetermined page and controls to display the at least one item on the touch screen 151. Because a size of the touch screen 151 is limited, when an input of forming a plurality of pages, arranging a predetermined item at each page, and requesting a specific page is received, the controller 180 provides the plurality of pages on the touch screen 151.

The controller 180 receives a scroll input of starting from a boundary surface of the touch screen 151 (S120).

The touch screen 151 occupies most of an entire body of the mobile terminal 100, and a boundary surface of the touch screen 151 indicates a portion in which a body of the mobile terminal 100 and the touch screen 151 are adjacent.

When the touch screen 151 has a quadrangular shape, the boundary surface of the touch screen 151 is divided into a right side, a left side, an upper side, and a lower side, i.e., an upper end boundary surface, a lower end boundary surface, a left side boundary surface, and a right side boundary surface.

According to an embodiment of the present invention, a boundary surface of the touch screen 151 indicates a portion in which the touch screen 151 and a body of the mobile terminal 100 are physically adjacent, but the present invention is not limited thereto.

For example, the touch screen 151 may be divided into a plurality of areas on a function basis, and a boundary surface of the touch screen 151 may include an indicator area (not shown) for identifying a system state of the mobile terminal 100.

Further, according to an embodiment of the present invention, in order to scroll a plurality of pages, a boundary surface of the touch screen 151 may include a predefined area on the touch screen 151. Embodiments related to the predefined area will be described later.

In embodiments of the present invention, a scroll input of scrolling a plurality of pages is received.

The touch screen 151 (or a touch pad) receives a touch input by scroll. As a user scrolls a touch screen (or a touch pad), the user moves an object, for example, a cursor or a pointer such as an icon displayed on the touch screen 151. Furthermore, when the user moves a finger on the touch screen 151, a moving path of the finger may be visually displayed on the touch screen 151. Thereby, an image displayed on the touch screen 151 can be easily edited.

In this document, according to embodiments, a touch input of scrolling a plurality of pages while exposing on the touch screen 151 is expressed as a scroll input, but the scroll input may be a flicking input to one area on the touch screen 151.

Further, the scroll input may include a drag input.

When a scroll input of starting from a boundary surface of the touch screen 151 is received, the controller 180 changes a slope of a page and a depth level of an inclined surface according to a scrolled distance (S130).

Figure 4A:
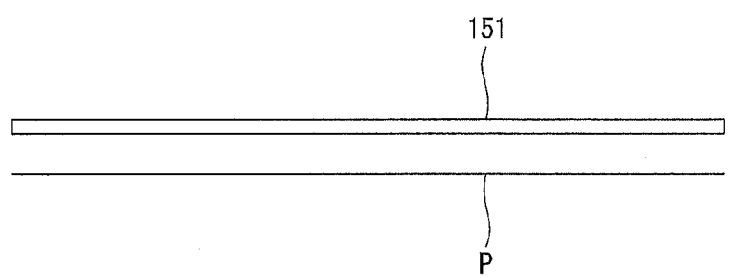
FIGS. 4A to 4E are diagrams illustrating an embodiment shown in FIG. 3.
Figure 4B:
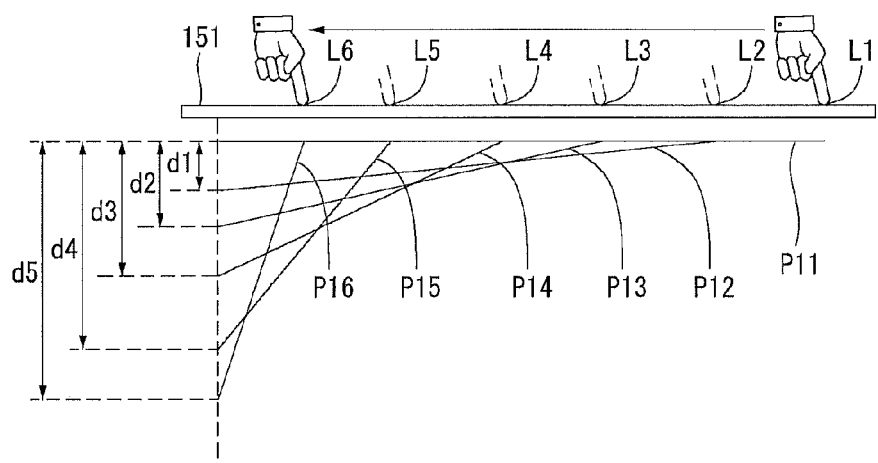
Figure 4C:
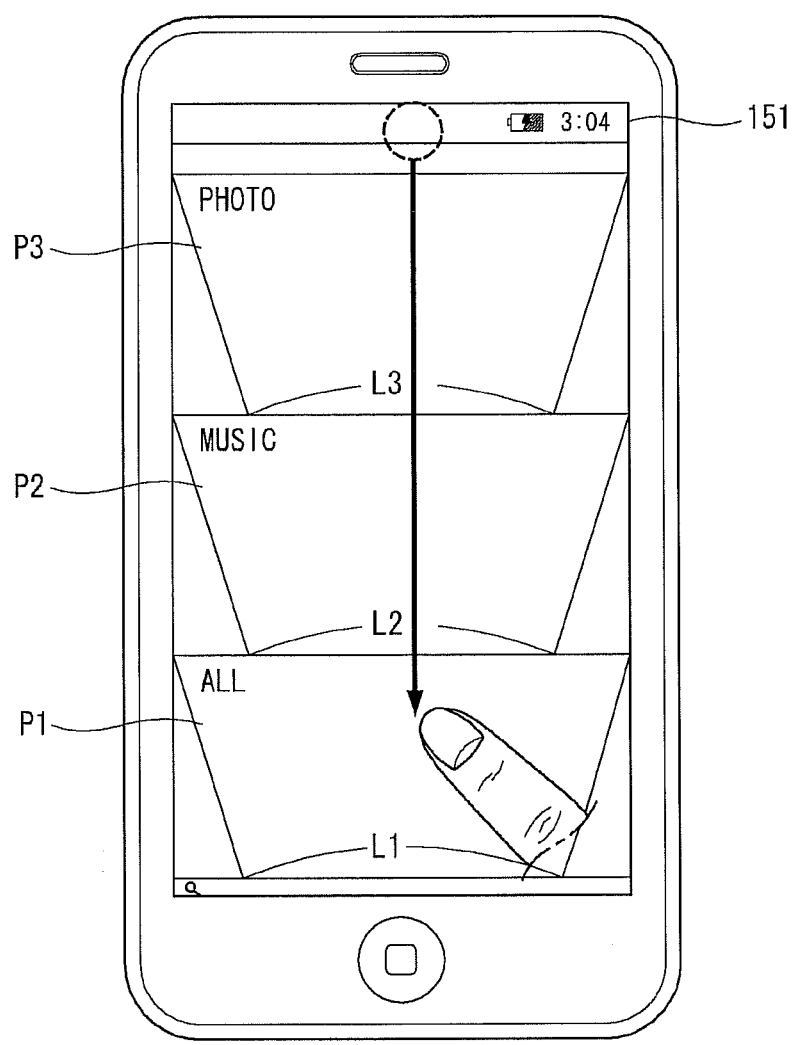

FIGS. 4A to 4C are conceptual diagrams illustrating a process of scrolling a page in embodiments of the present invention.

For example, referring to FIG. 4A, when providing a specific page P on the touch screen 151, the controller 180 may control the page P to be viewed in a parallel state to the touch screen 151. In this case, the page P is arranged to correspond to a size of an entire surface of the touch screen 151. Therefore, the touch screen 151 does not have empty space, except for the page P.

Referring to FIG. 4B, the touch screen 151 receives a scroll input from a first area L1 to a fifth area L5, and accordingly, the controller 180 controls a display of the page P along a path of the scroll input while giving a three-dimensional effect to the page P shown in FIG. 4A.

The three-dimensional effect can be acquired by increasing a depth level of an inclined page surface while a page is inclined in a scroll direction when the page is scrolled.

For example, in FIG. 4B, when a scroll input from the first area L1 to a second area L2 is received, the controller 180 may change a slope from a page P11 to a page P12 while moving the page P11 in a scroll direction. As the slope is changed, a depth level of the page P11 is changed from 0 to d1.

Further, when a scroll input is received from the second area L2 to a third area L3, the controller 180 changes a slope from the page P12 to the page P13 while moving the page P12 in a scroll direction. As the slope is changed, depth level of the page P12 is changed from d1 to d2.

In a scroll input to the remaining areas L4, L5, and L6, as described above, while a slope of a page itself is changed in a scroll direction, a depth level may be simultaneously changed.

When a user views, in order to have a depth impression, the controller 180 reduces a length of an inclined side surface of a scrolled page. Further, when a plurality of scrolled pages exist, the controller 180 scrolls a plurality of pages while controlling to sequentially expose the plurality of pages on the touch screen 151.

For example, referring to FIG. 4C, when a drag input of starting from a predefined area PR and moving to a lower end of the touch screen 151 is received, the controller 180 scrolls predetermined pages P1, P2, and P3 in a drag direction. In this case, as the page P1 is scrolled to a lower end of the touch screen 151, a slope of the page P1 increases, and a length of a surface in which the page P1 is inclined becomes short. As a length of one surface of the page P1 is abbreviated and displayed to L1, a three-dimensional effect is given to the page P1.

In the page P2, by setting a length of an inclined surface to L2, and in the page P3, by setting a length of an inclined surface to L3, a length of an inclined surface is differently set according to an inclined degree of each of pages P1, P2, and P3. Preferably, as a slope increases, a length of an inclined surface may be more shortly set, and a shortened degree of one surface inclined according to a slope may be previously set by a user.

The controller 180 scrolls at least a portion of each page of a scrolled plurality of pages while overlapping.

Figure 4D:
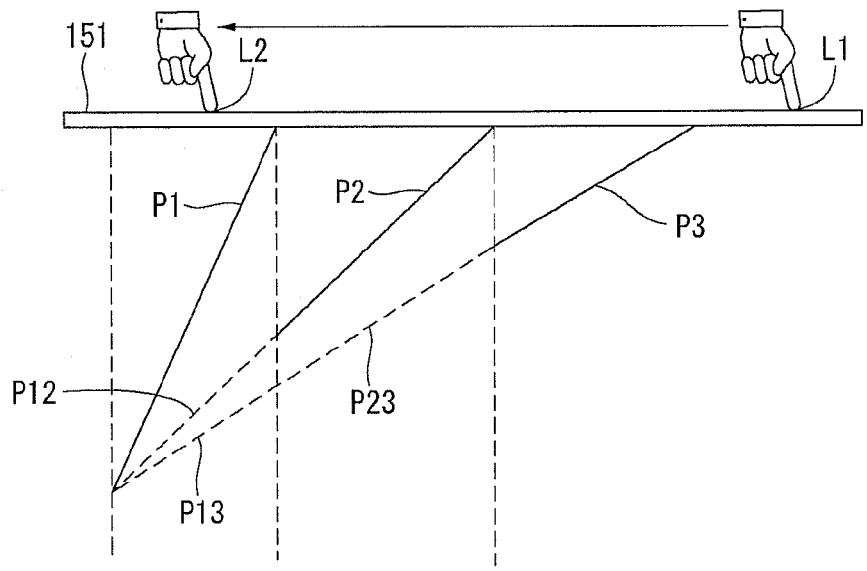

For example, referring to FIG. 4D, with reference to a state in which the first page P1, the second page P2, and the third page P3 are sequentially exposed on the touch screen 151, the first page P1 and the second page P12 may be overlapped in an area P12. The second page P2 and the third page P3 may be overlapped in an area P23. The first page P1 and the third page P3 may be overlapped in an area P13.

However, the overlapped areas P12, P13, and P23 are portions that are not viewed to a user through the touch screen 151, and only the page P1, the page P2, and the page P3 are exposed on the touch screen 151 and are recognized by the user.

Figure 4E:
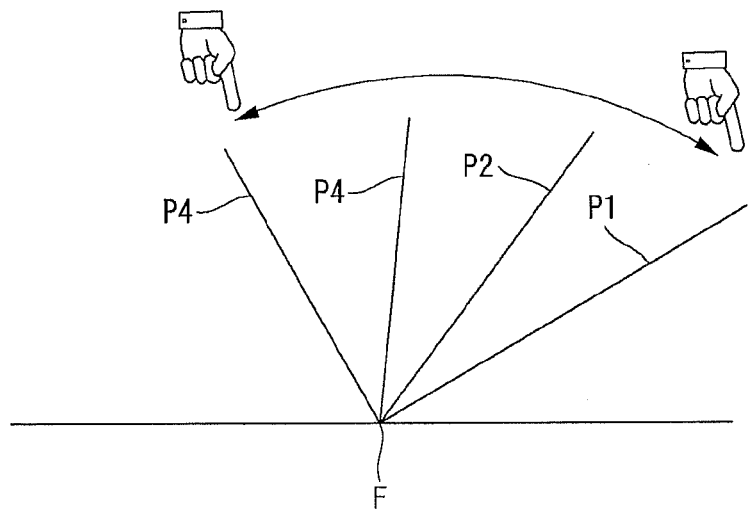

FIG. 4E is a diagram illustrating a concept in which a plurality of pages are scrolled while being sequentially exposed on a touch screen according to a predetermined scroll input in embodiments of the present invention.

Referring to FIG. 4E, a plurality of pages P1, P2, P3, and P4 are fixed based on a specific point F, and when an input of scrolling from the first area to the second area of the touch screen 151 is received, the controller 180 gives a sequentially spreading effect to the plurality of pages P1, P2, P3, and P4 as turning pages of a book in a scroll direction.

A method of giving the above effect to the plurality of pages P1, P2, P3, and P4 may be variously modified and performed.

For example, the touch screen 151 may include a panel for embodying stereoscopic vision, and the controller 180 controls to display the plurality of pages P1, P2, P3, and P4 in a three-dimensional shape in which each of the plurality of pages P1, P2, P3, and P4 has a predetermined depth level with respect to a predetermined scroll input. That is, as a scroll input is received, a three-dimensional page scrolled while being sequentially exposed through the touch screen 151 can be embodied.

FIG. 5 illustrates an example of a mobile terminal screen illustrating a method of controlling a mobile terminal shown in FIG. 3.

Referring to FIG. 5, the controller 180 receives a touch input to a predefined area on the touch screen 151 (FIG. 5A). The predefined area may be an upper end boundary surface of the touch screen 151, and the upper end boundary surface may be an indicator area.

Referring to FIG. 5B, the controller 180 moves an upper end surface P1b of the first page P1 in a scroll direction while inclining a lower end surface P1a of the first page P1 toward the inside of the touch screen 151. Accordingly, some of an upper end surface of the second page P2 is exposed on the touch screen 151. Here, a length of an upper end corner P1b is not changed in a length of each corner of the first page, and a length of side corners P1c and P1d and a length of a lower end corner P1a are shortened.

Thereby, the first page P1 may be displayed in a three-dimensional shape having a predetermined depth level based on the touch screen 151.

FIG. 5C illustrates a state in which a plurality of pages P1, P2, and P3 are scrolled and exposed on the touch screen 151 in response to the scroll input.

When each of pages is scrolled, the controller 180 controls to display and scroll page attribute identifiers Id1, Id2, and Id3 that can identify an attribute of each page at an upper end surface of each page.

Hereinafter, exemplary embodiments of the present invention will be described.

Figure 6:
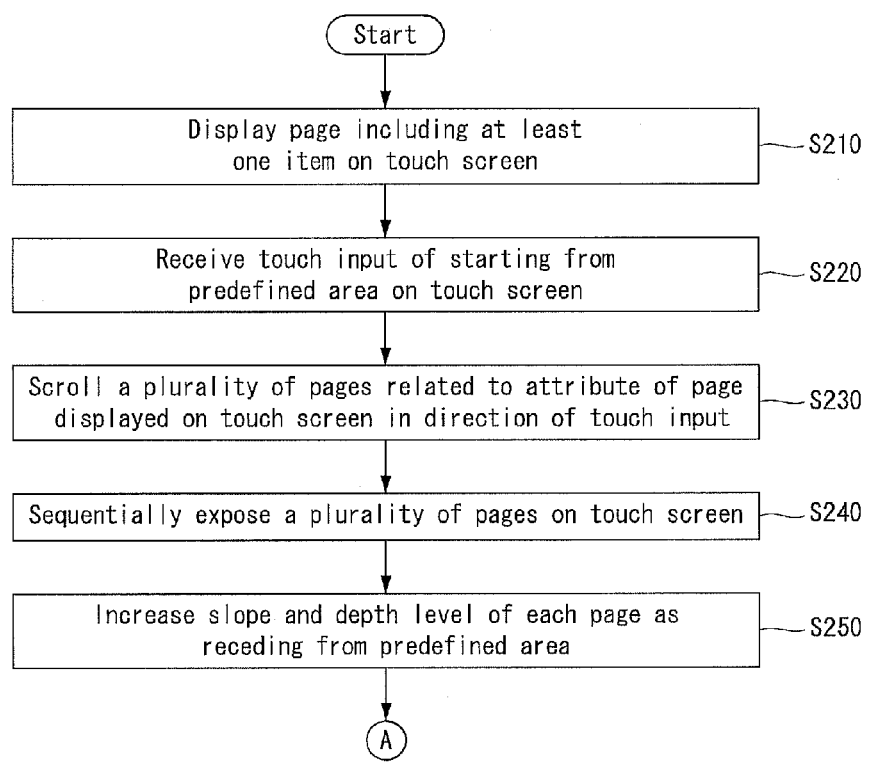
FIG. 6 is a flowchart illustrating a method of controlling a mobile terminal according to an embodiment of the present invention.

FIG. 6 is a flowchart illustrating a method of controlling a mobile terminal according to an embodiment of the present invention.

The method of controlling a mobile terminal according to an embodiment of the present invention can be performed in the mobile terminal 100 described with reference to FIGS. 1 and 2. Hereinafter, a method of controlling a mobile terminal according to an embodiment of the present invention and operation of the mobile terminal 100 for embodying the same will be described in detail with reference to necessary drawings.

Referring to FIG. 6, the controller 180 controls to display a page including at least one item on the touch screen 151 (S210).

The item may include contents such as an icon, a widget, an application, a still picture, a moving picture, a data list, an animation, and a flashlight.

The controller 180 receives a touch input of moving from a predefined area on the touch screen 151 to a lower end of the touch screen 151 (S220).

The predefined area may be an indicator area for identifying an attribute of a displayed page.

The attribute of the page is determined by an attribute of at least one items grouped to the page.

For example, when all items arranged at the page are pictures, an attribute of the page may be a picture page. Further, when an item arranged at the page is a moving picture, an attribute of the page may be a moving picture page.

Further, the page may not include a predetermined grouped item, and a page itself may form one item. For example, a web browser may be executed in the page and thus the page may display a predetermined web site.

The controller 180 controls to scroll a plurality of pages related to an attribute of a page displayed on the touch screen 151 in a direction of the touch input (S230).

A page related to an attribute of a page displayed on the touch screen 151 may be a category page. That is, a page related to an attribute of a page displayed on the touch screen 151 may be a page that classifies items displayed in the page into a plurality of categories and in which items belonging to each category are gathered.

Therefore, an item that is not presently displayed on the touch screen 151 is included in a predetermined page by a predetermined scroll operation and is displayed on the touch screen 151.

Here, the controller 180 sequentially exposes a plurality of pages on the touch screen 151 (S240) and increases a slope and a depth level of each page sequentially exposed as receding from the predefined area (S250).

FIGS. 7A to 7H are diagrams illustrating examples in which a plurality of items are displayed on a touch screen according to an embodiment shown in FIG. 6.

Figure 7A:
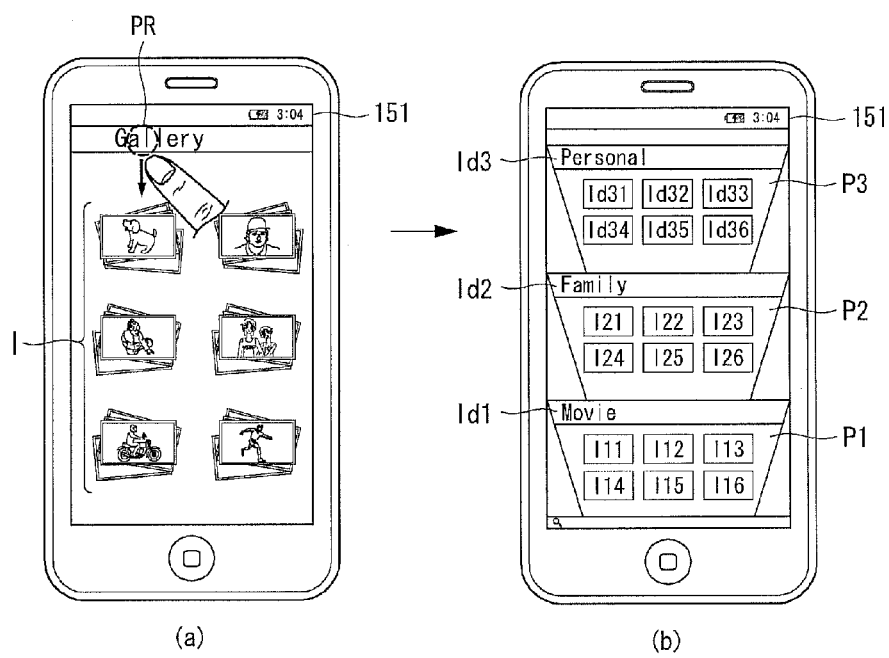
FIGS. 7A to 7H are diagrams illustrating examples in which a plurality of items are displayed on a touch screen according to an embodiment shown in FIG. 6.

FIG. 7A illustrates an example of page scroll when a gallery page is displayed on the touch screen 151.

The controller 180 controls to display a gallery page in which at least one image I is included on the touch screen 151. The gallery page may display an indicator area PR for identifying an attribute of the page in an upper end portion of the page.

When a touch input of moving to a lower end of the touch screen 151 is received in the indicator area PR, the controller 180 sequentially exposes the second page P2 and the third page P3 from the first page P1 on the touch screen 151.

In each page, page indicators Id1, Id2, and Id3 are displayed and scrolled at an upper end portion of each page. Before receiving a scroll input, a page displayed on the touch screen 151 is a gallery page, and a plurality of images are included in the gallery page.

Therefore, the controller 180 classifies a plurality of images included in the gallery page in response to the scroll input into a movie, a family picture, and a personal picture, forms each classified image into a separate page, and sequentially exposes the each classified image on the touch screen 151.

The controller 180 controls to display an identifier Id1 for identifying a movie page P1 in an upper end portion of the page, and the identifier Id1 may include a plurality of movie files I11, I12, I13, I14, I15, and I16.

The controller 180 exposes and scrolls a family picture page P2 as a next order of the movie page P1 on the touch screen 151. The controller 180 controls to display the family picture page P2 with an identifier Id2, and the identifier Id2 may include a plurality of family picture files I21, I22, I23, I24, I25, and I26.

The personal picture page P3 exposed and scrolled as a next order of the family picture page P2 is performed with the above-described method.

The movie page P1, the family picture page P2, and the personal picture page P3 are each sequentially exposed and scrolled on the touch screen 151, and a process of giving a three-dimensional effect to each page while being scrolled has been described with reference to FIGS. 3 and 4A to 4E and therefore this will be omitted. Exemplary embodiments to be described later will be described in a similar method.

The gallery page includes at least one folder and may store an image on a folder basis.

For example, the folder may include a folder for storing movies, a folder for storing family pictures, and a folder for storing individually photographed pictures.

In response to the scroll input, the controller 180 controls to display and scroll at least one image categorized on a folder basis in a plurality of pages, respectively. That is, in response to the scroll input, the controller 180 controls to sequentially expose the movie page P1, the family picture page P2, and the personal photographing page P3 on the touch screen 151.

Figure 7B:
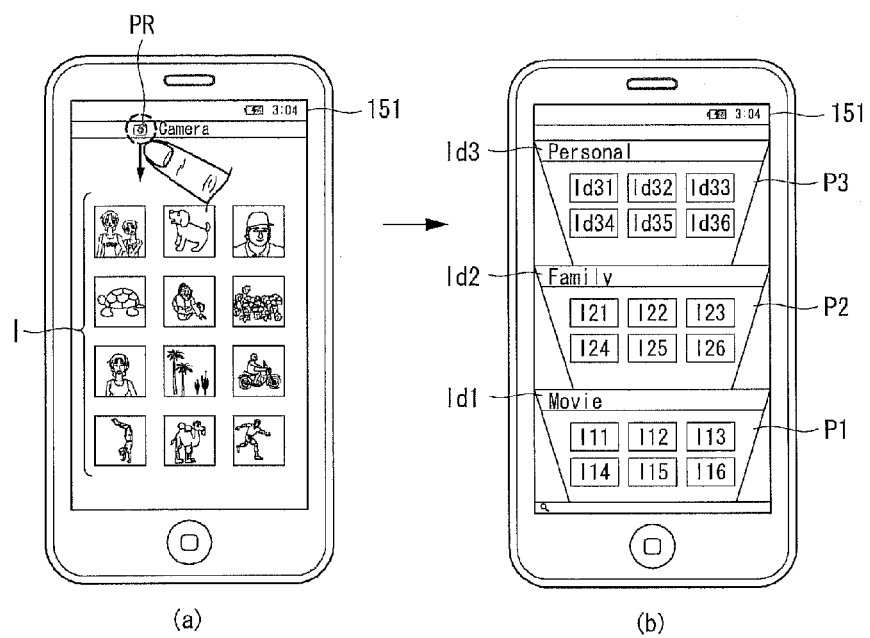

Referring to FIG. 7B, a page presently displayed on the touch screen 151 is a screen for displaying an execution result of a camera application.

The page may display at least one image I photographed through the camera application, and the plurality of images I are classified into at least one category in response to a scroll input of starting from a predefined area PR, and a plurality of pages may be scrolled.

Figure 7C:
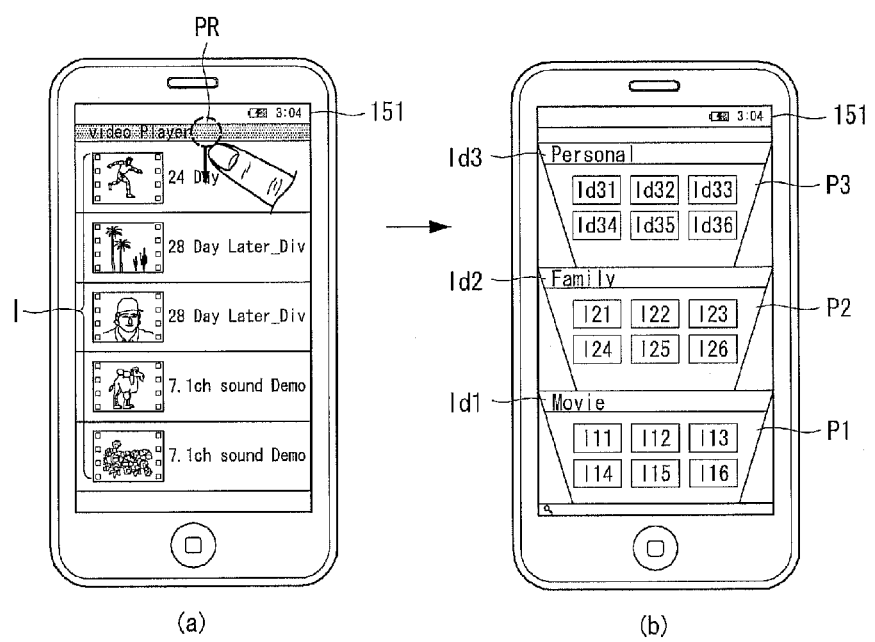

Referring to FIG. 7C, a page presently displayed on the touch screen 151 is a screen for displaying a moving picture list DL stored in the mobile terminal 100.

The controller 180 sequentially exposes and scrolls a plurality of pages including an item related to moving pictures included in the moving picture list DL on the touch screen 151.

Figure 7D:
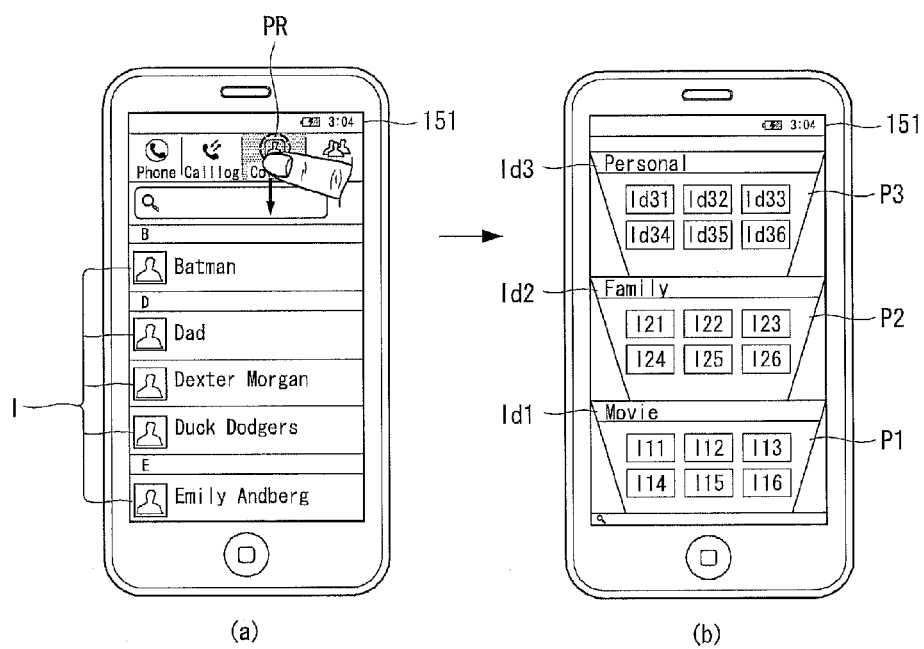

Referring to FIG. 7D, a page presently displayed on the touch screen 151 is a screen for displaying a phonebook page. The phonebook page may include another party's image I.

When a scroll input of starting from a predefined area (e.g., a phonebook selection area) on the touch screen 151 is received, the controller 180 classifies phone number information stored at the phonebook page into groups such as a family, a friend, and a company and sequentially scrolls a family group page 91, a friend group page 92, and a company group page 93.

Here, when the predefined area is a call log area, the controller 180 classifies communication another party into a plurality of groups and scrolls a page in which call log details are recorded on each group basis.

Figure 7E:
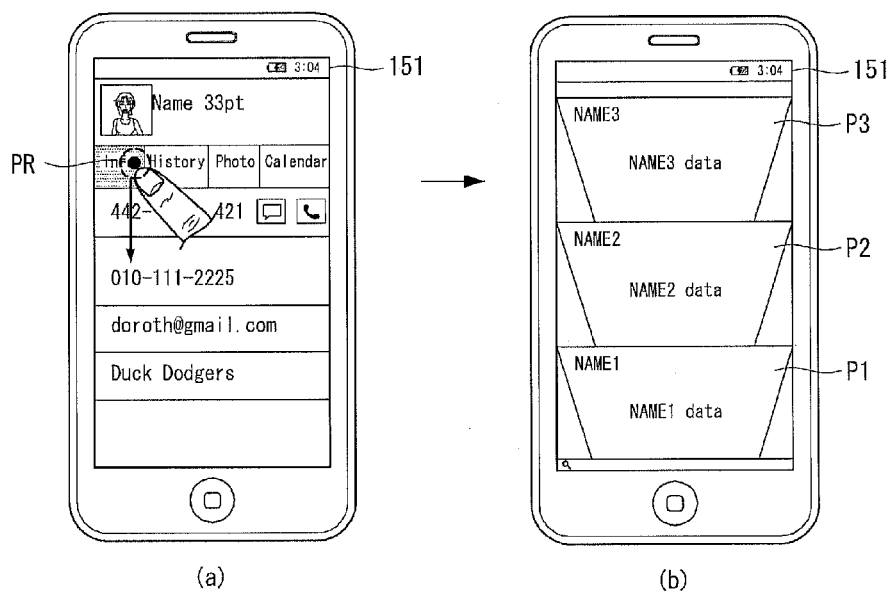

Referring to FIG. 7E, a page presently displayed on the touch screen 151 represents phone number information of a specific user (name is 33 pt).

When a scroll input of starting from a predefined area PR (e.g., a phone number information selection area) on the touch screen 151 is received, the controller 180 forms a page on a user basis stored in a phonebook and forms each page to include personal information including a phone number and an e-mail address of each user.

Figure 7F:
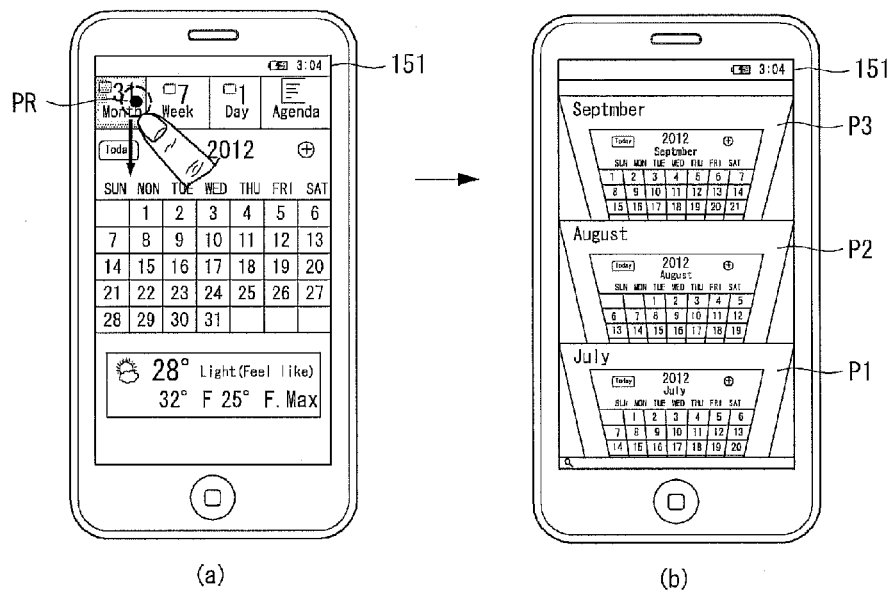

Referring to FIG. 7F, a page presently displayed on the touch screen 151 is an execution screen of a calendar application.

While executing the calendar application, when a scroll input of starting from a predefined area PR (e.g., a month) is received, the controller 180 sequentially scrolls a page representing information about a month presently displayed on the touch screen 151 and a next month.

Figure 7G:
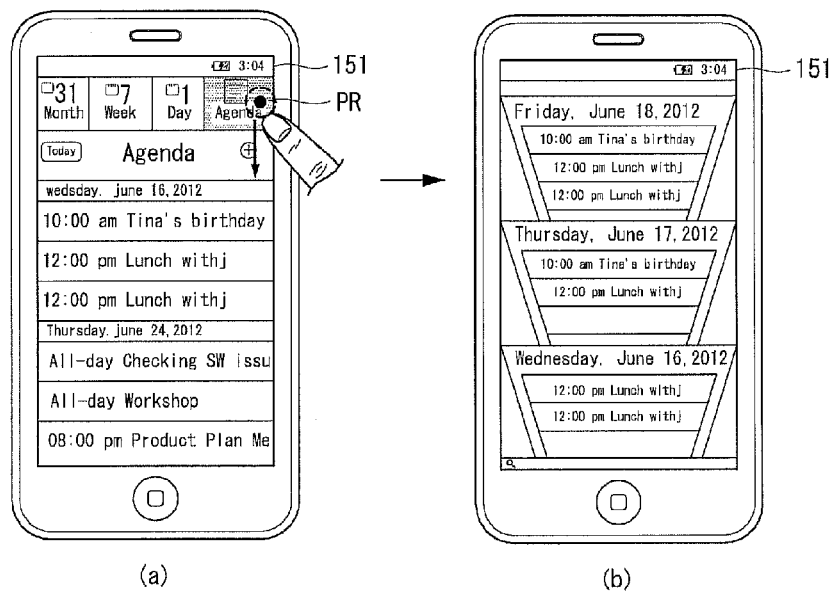

Referring to FIG. 7G, while executing the calendar application, when a scroll input of starting from a predefined area PR (e.g., agenda) is received, the controller 180 forms and sequentially scrolls each page with agenda information of a present date presently displayed on the touch screen 151 and agenda information of a subsequent date.

Figure 7H:
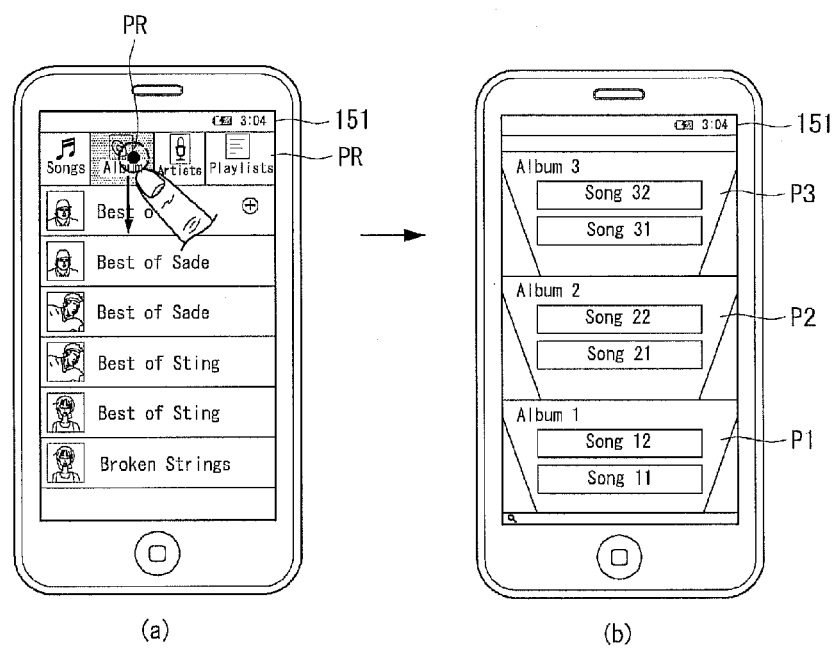

Referring to FIG. 7H, a page presently displayed on the touch screen 151 is a screen for executing a music reproduction application.

When a scroll input started from a predefined area PR (e.g., an album) is received, the controller 180 sequentially scrolls a page on an album basis. In each album page, music files (song 11, song 12, . . . , song 32) listed at each album may be displayed.

Figure 8:
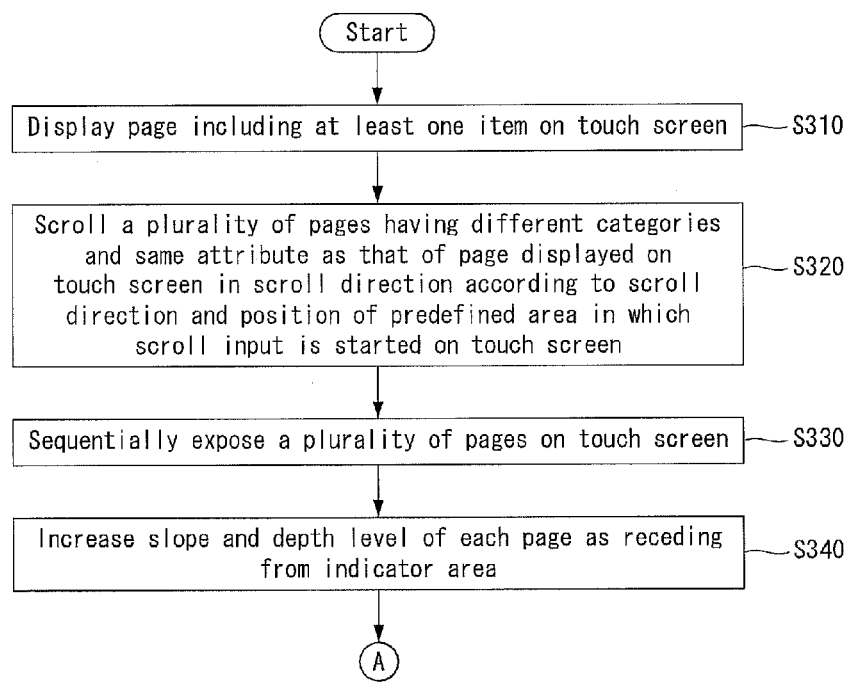
FIG. 8 is a flowchart illustrating a method of controlling a mobile terminal according to an embodiment of the present invention.

FIG. 8 is a flowchart illustrating a method of controlling a mobile terminal according to an embodiment of the present invention.

Figure 9A:
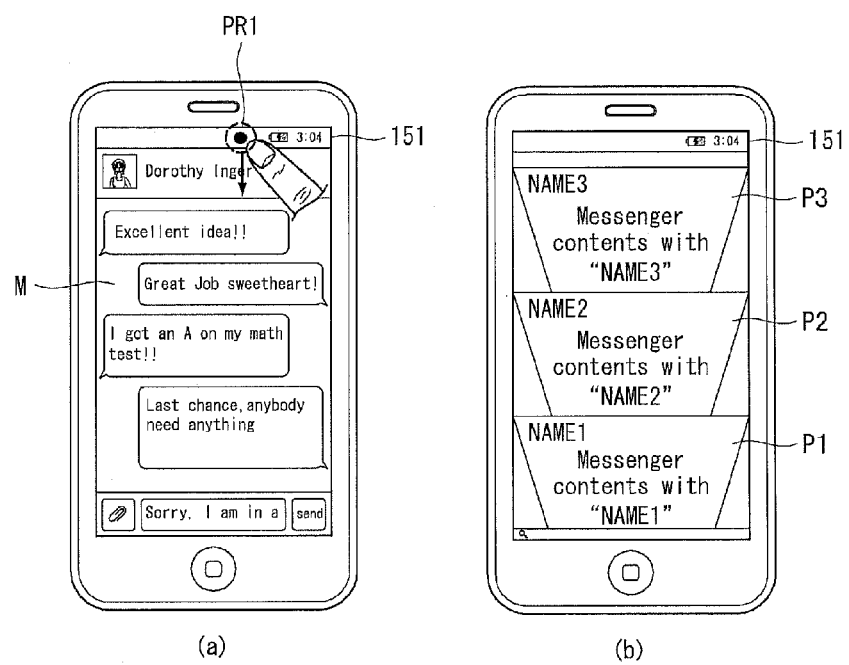
FIGS. 9A to 9C are diagrams illustrating examples of scrolling pages of different categories according to a scroll direction and a position in which a scroll input is started according to an embodiment shown in FIG. 8.
Figure 9B:
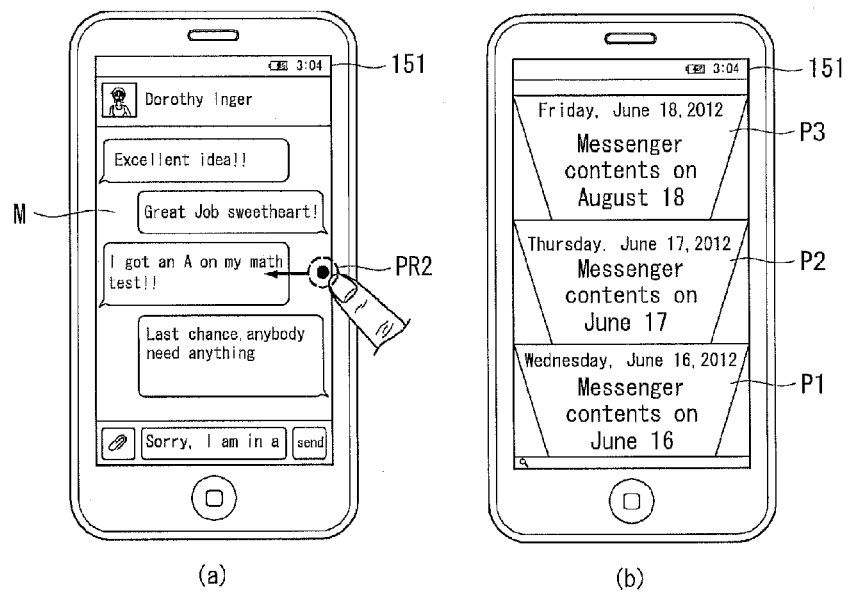
Figure 9C:
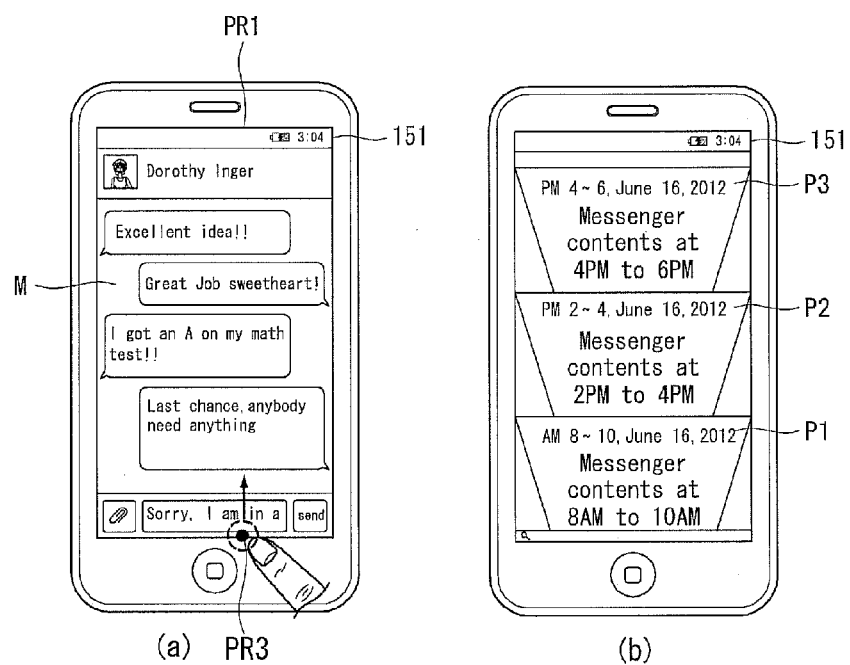

FIGS. 9A to 9C are diagrams illustrating examples of scrolling pages of different categories according to a scroll direction and a position in which a scroll input is started according to an embodiment shown in FIG. 8.

Referring to FIG. 8, the controller 180 controls to display a page including at least one item on the touch screen 151 (S310).

The controller 180 scrolls a plurality of pages having different categories and the same attribute as that of a page displayed on the touch screen 151 in the scroll direction according to a scroll direction and a position of a predefined area in which a scroll input is started on the touch screen 151 (S320).

A predefined area in which the scroll input is started may include upper end, lower end, left side, and right side boundary surfaces of the touch screen 151. Further, the predefined area may be an area related to an attribute of a page presently displayed on the touch screen 151.

For example, when a scroll direction is a vertical direction, the predefined area may be an area related to an attribute of a page presently displayed on the touch screen 151.

Further, for example, when a scroll direction is a lateral direction, the predefined area may be a lateral boundary surface of the touch screen 151.

In examples of scrolling pages having different categories according to a scroll direction and a position in which a scroll input is started, as shown in FIGS. 9A to 9C, while executing the same messenger application, when a position in which a scroll input is started is an upper end boundary surface PR1 of the touch screen 151, a plurality of pages P1, P2, and P3 classified on a name basis of a messenger another party may be scrolled in a scroll direction (see FIG. 9A).

Further, when a position in which a scroll input is started is a right side boundary surface PR2 of the touch screen 151, a plurality of pages P1, P2, and P3 classified on a messenger date basis may be scrolled in a scroll direction (see FIG. 9B).

Further, when a position in which a scroll input is started is a lower end boundary surface PR3 of the touch screen 151, a plurality of pages P1, P2, and P3 classified on a messenger date basis may be scrolled in a scroll direction.

In the foregoing embodiment, an example in which a plurality of pages related to an attribute of a page displayed on the touch screen 151 are scrolled while being sequentially exposed in a scroll direction has been described.

Hereinafter, examples of editing a plurality of pages exposed on the touch screen 151 through a predetermined user manipulation will be described in detail.

Figure 10:
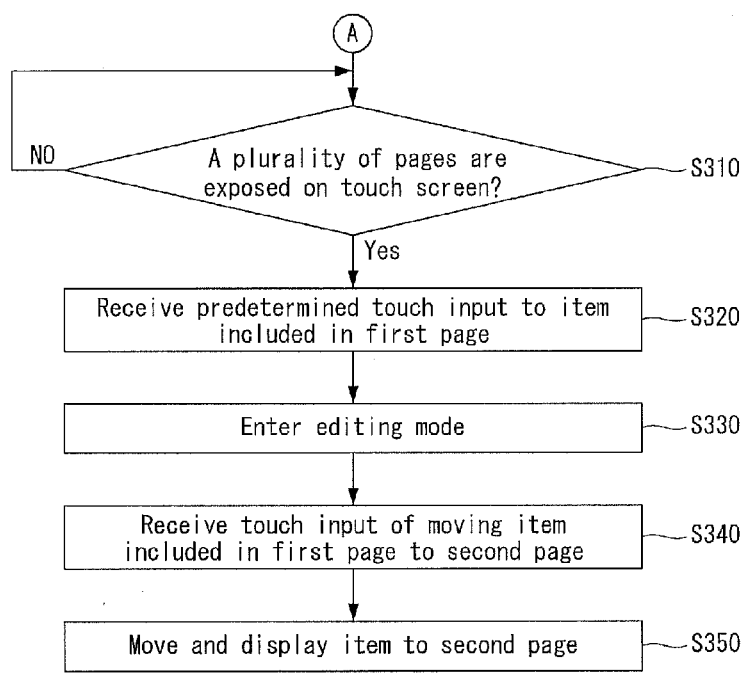
FIG. 10 is a flowchart illustrating a method of controlling a mobile terminal according to an embodiment of the present invention.

FIG. 10 is a flowchart illustrating a method of controlling a mobile terminal according to an embodiment of the present invention.

Figure 11A:
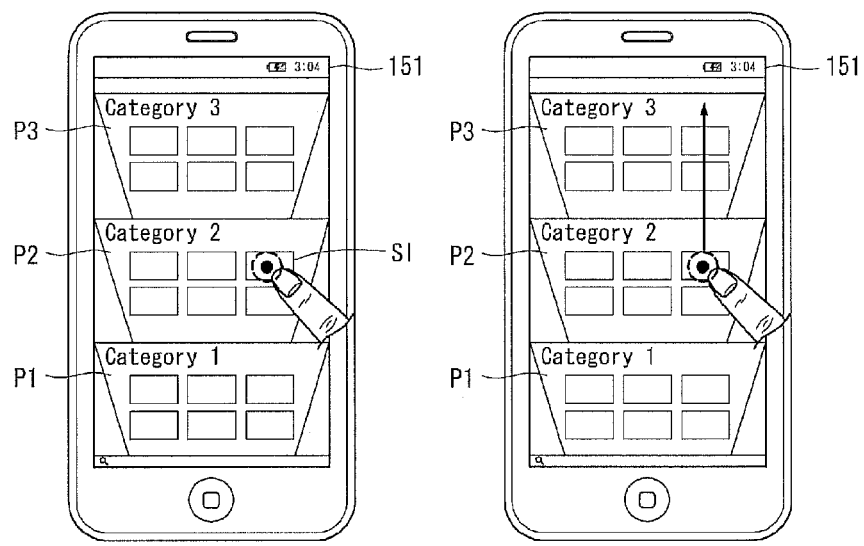
FIGS. 11A to 11C are diagrams illustrating an example of moving an item included in a specific page to another page in a state in which a plurality of pages are exposed on a touch screen according to an embodiment shown in FIG. 10.
Figure 11B:
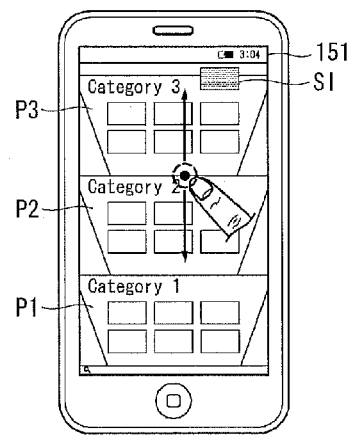
Figure 11C:
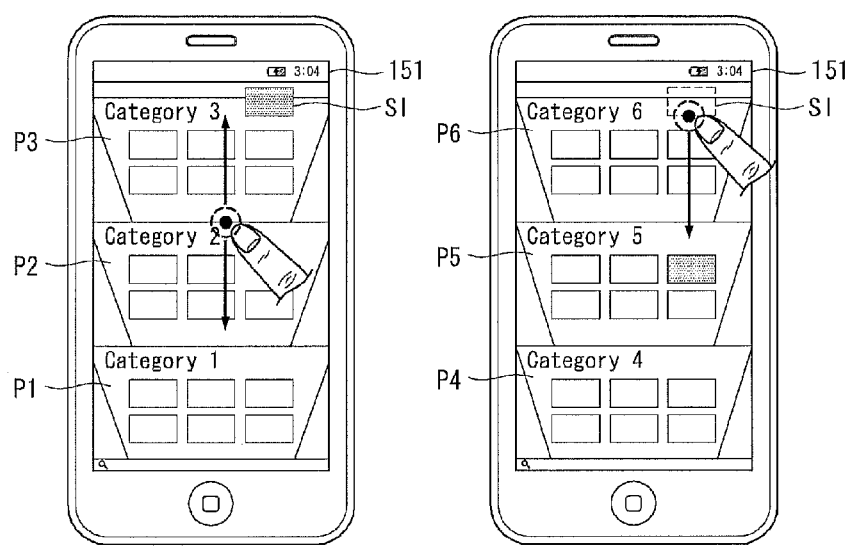

FIGS. 11A to 11C are diagrams illustrating an example of moving an item included in a specific page to another page in a state in which a plurality of pages are exposed on a touch screen according to an embodiment shown in FIG. 10.

Referring to FIG. 10, the controller 180 determines whether a plurality of pages are exposed on the touch screen 151 through the foregoing embodiments (S310).

The controller 180 receives a predetermined touch input to an item included in a first page of a plurality of pages exposed on the touch screen 151 (S320).

A predetermined touch input to the first page may be a touch input for entering a plurality of pages to an editing mode. For example, the predetermined touch input may be a long touch input to a specific item included in the first page.

When a long touch input to the first page is received, the controller 180 controls to operate the mobile terminal 100 in an editing mode (S330).

The controller 180 receives a touch input of moving an item included in the first page to the second page in the editing mode (S340).

The controller 180 controls to move and display the item to the second page (S350).

Referring to FIG. 11A, the controller 180 receives a long touch input to a specific item SI of the second page P2 of a plurality of pages P1, P2, and P3 exposed on the touch screen 151. In response to the long touch input, the mobile terminal 100 enters an editing mode.

Thereafter, the controller 180 receives a touch input of moving the specific item SI to one area of the touch screen 151.

Referring to FIG. 11B, as a touch input of moving the specific item SI to one area of the touch screen 151 is received, the controller 180 changes a position of the specific item SI, as shown in FIG. 11B.

Thereafter, the controller 180 receives a touch input of searching for a page to insert the specific item SI. The touch input may be a scroll input of a vertical direction to pages exposed on the touch screen 151.

A plurality of pages exposed on the touch screen 151 may be changed from P1, P2, and P3 to P4, P5, and P6 according to a scroll input of the vertical direction.

Referring to FIG. 11C, as a touch input of inserting the specific item SI into any one page of found pages is received, the controller 180 changes a page in which the specific item SI is included. Accordingly, the specific item SI included in the second page P2 may be disposed at a fifth page P5.

The mobile terminal 100 according to an embodiment of the present invention can perform operation related to a selected page by selecting one of a plurality of pages exposed on the touch screen 151.

Figure 12:
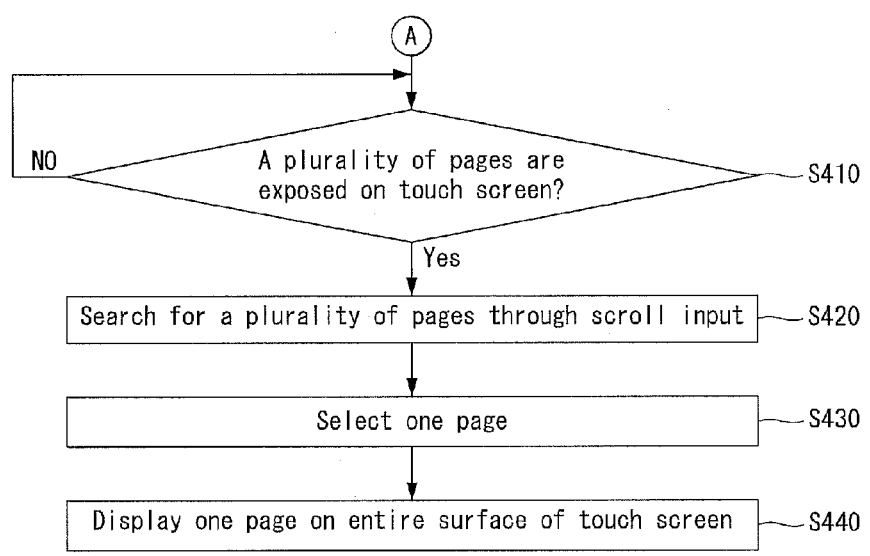
FIG. 12 is a flowchart illustrating a method of controlling a mobile terminal according to an embodiment of the present invention.

FIG. 12 is a flowchart illustrating a method of controlling a mobile terminal according to an embodiment of the present invention.

Figure 13:
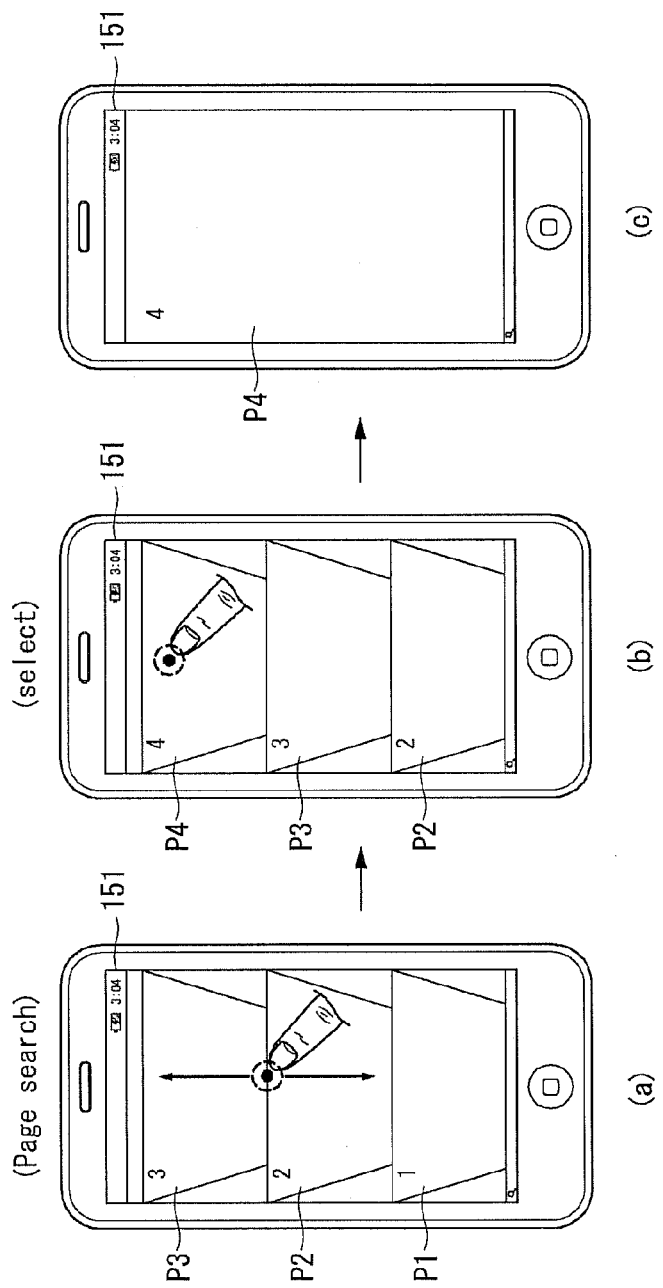
FIGS. 13 and 14 are diagrams illustrating examples of controlling execution of a specific page or an item included in a specific page in a state in which a plurality of pages are exposed on a touch screen according to an embodiment shown in FIG. 12.
Figure 14:
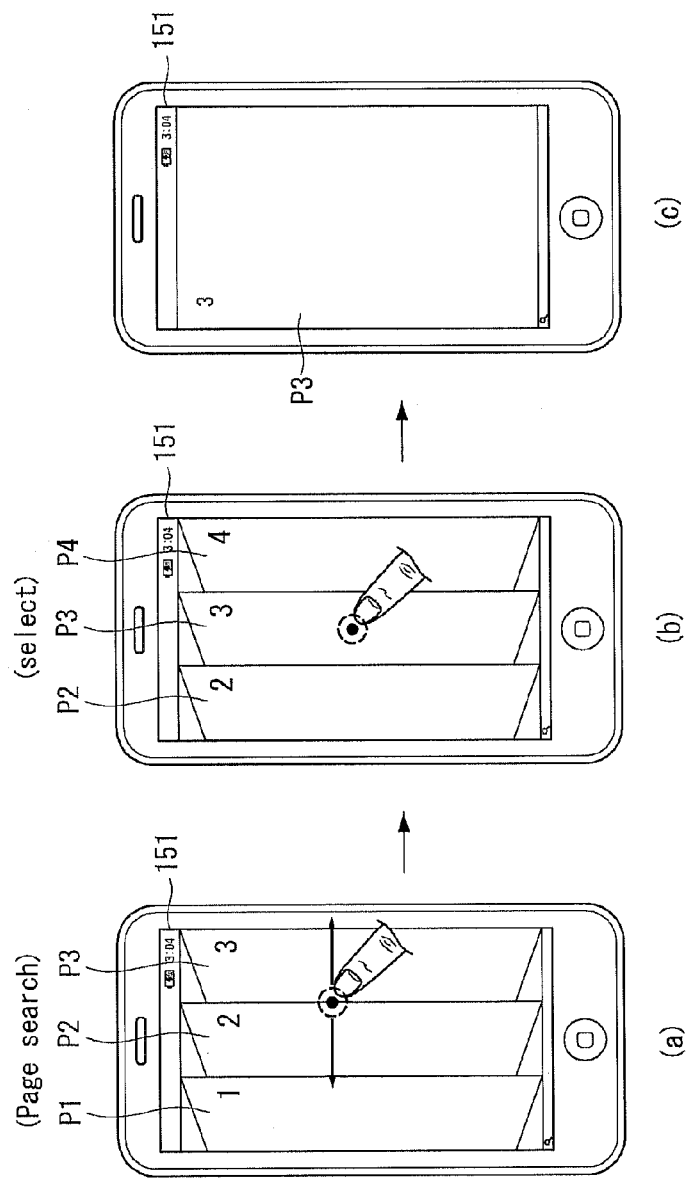

FIGS. 13 and 14 are diagrams illustrating examples of controlling execution of a specific page or an item included in a specific page in a state in which a plurality of pages are exposed on a touch screen according to an embodiment shown in FIG. 12.

Referring to FIG. 12, the controller 180 determines whether a plurality of pages are exposed on the touch screen 151 (S410), and if a plurality of pages are exposed on the touch screen 151, the controller 180 receives a scroll input of searching for one of the exposed plurality of pages (S420).

Thereafter, the controller 180 selects one page (S430) and controls to display the selected page on an entire surface of the touch screen 151 (S440).

For example, referring to FIG. 13, in a state in which a plurality of pages P1, P2, and P3 are sequentially exposed on the touch screen 151 by a scroll input started from an upper end boundary surface of the touch screen 151, an additional scroll input may be received (FIG. 13A).

The controller 180 controls to display a fourth page P4 exposed after a third page P3 on the touch screen 151 through the additional scroll input (FIG. 13B).

When a touch input of selecting the fourth page P4 is received, the controller 180 controls to display the fourth page P4 in an entire area of the touch screen 151 (FIG. 13C)

FIG. 14 illustrates an example of selecting a specific page P3 and displaying the specific page P3 at an entire surface of the touch screen 151 in a state in which a scroll start position is a right side boundary surface of the touch screen 151 and a plurality of pages are scrolled in a horizontal direction.

Figure 15:
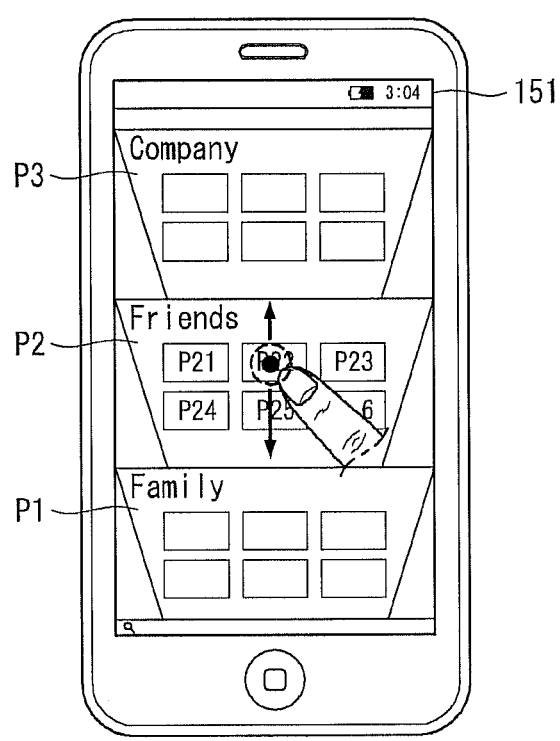
FIGS. 15 to 16 are diagrams illustrating an example of controlling execution of at least one item included in a specific page in a state in which a plurality of pages are exposed on a touch screen.
Figure 16:
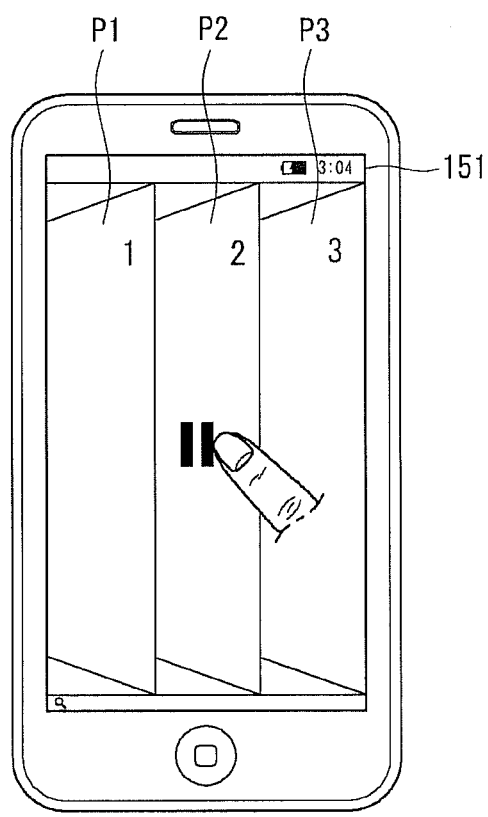

FIGS. 15 to 16 are diagrams illustrating examples of controlling operation of at least one item included in a specific page in a state in which a plurality of pages are exposed on a touch screen.

Referring to FIG. 15, in a state in which a plurality of pages P1, P2, and P3 are exposed on the touch screen 151, the controller 180 receives a scroll input to a plurality of items P21, P22, P23, P24, P25, and P26 included in the second page P2. Accordingly, in a state in which a plurality of pages P1, P2, and P3 is exposed on the touch screen 151, a plurality of items P21, P22, P23, P24, P25, and P26 included in the second page P2 may be scrolled in a vertical direction. At least one item that is not presently displayed in the second page P2 may be exposed on the touch screen 151 according to the scroll input.

Referring to FIG. 16, in a state in which a plurality of pages P1, P2, and P3 are displayed on the touch screen 151, when a predefined touch input to the second page P2 is received, the controller 180 controls execution of at least one item executed through the second page.

For example, referring to FIG. 16, when multimedia is being reproduced through the second page, if a long touch input to the second page P2 is received, the controller 180 may stop reproduction of the reproducing multimedia.

Accordingly, in a state in which a plurality of pages are exposed on the touch screen 151, execution of at least one item that can be executed through each page can be controlled without a process of displaying each page on an entire surface of the touch screen 151.

In the mobile terminal 100 according to an embodiment of the present invention, a gap between a plurality of pages separated on the touch screen 151 with a predetermined gap can be adjusted.

Figure 17:
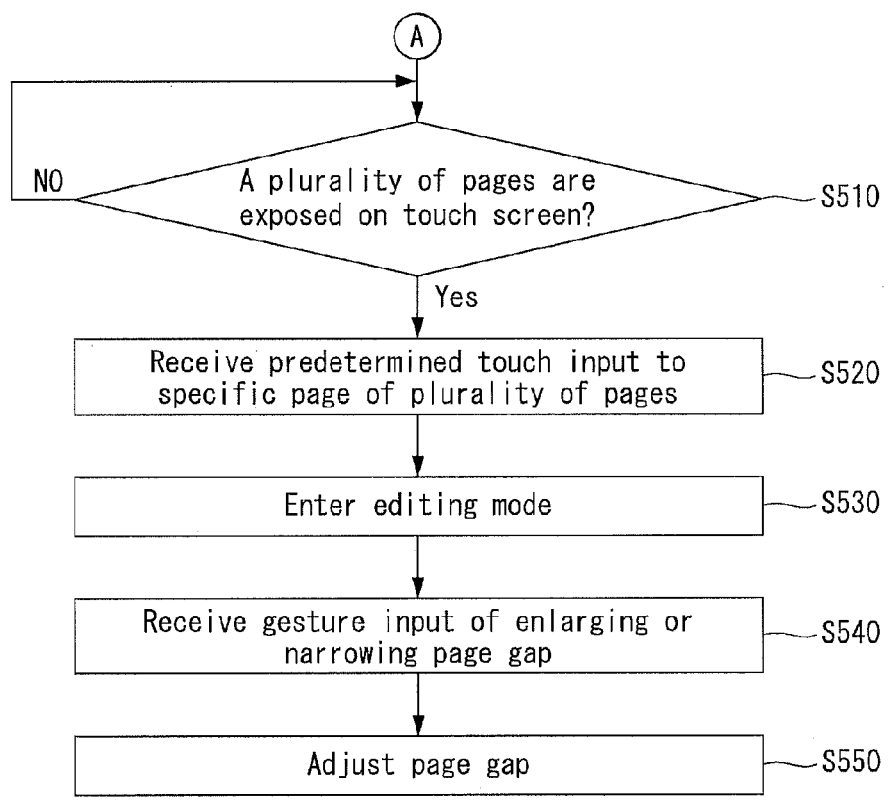
FIG. 17 is a flowchart illustrating a method of controlling a mobile terminal according to an embodiment of the present invention.
Figure 18:
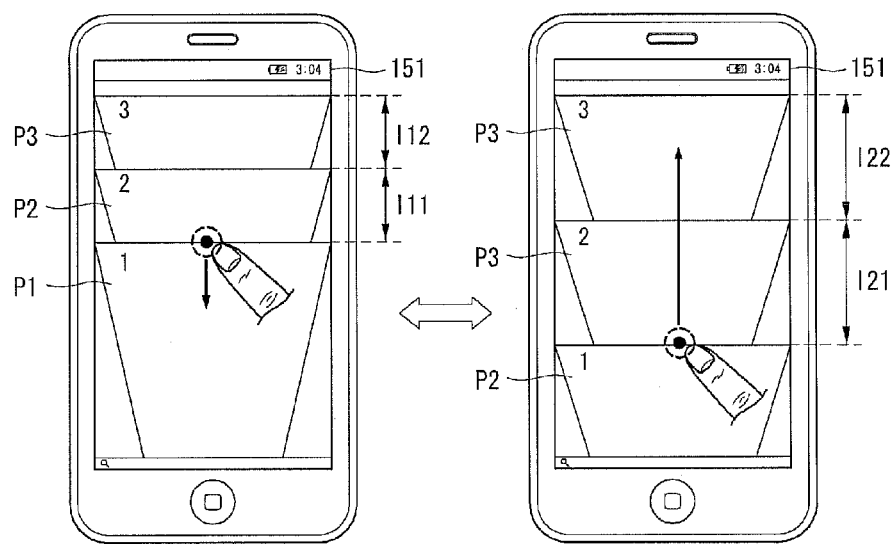
FIGS. 18 to 19 are diagrams illustrating examples of changing a page arrangement characteristic in a state in which a plurality of pages are exposed on a touch screen according to an embodiment shown in FIG. 17.
Figure 19:
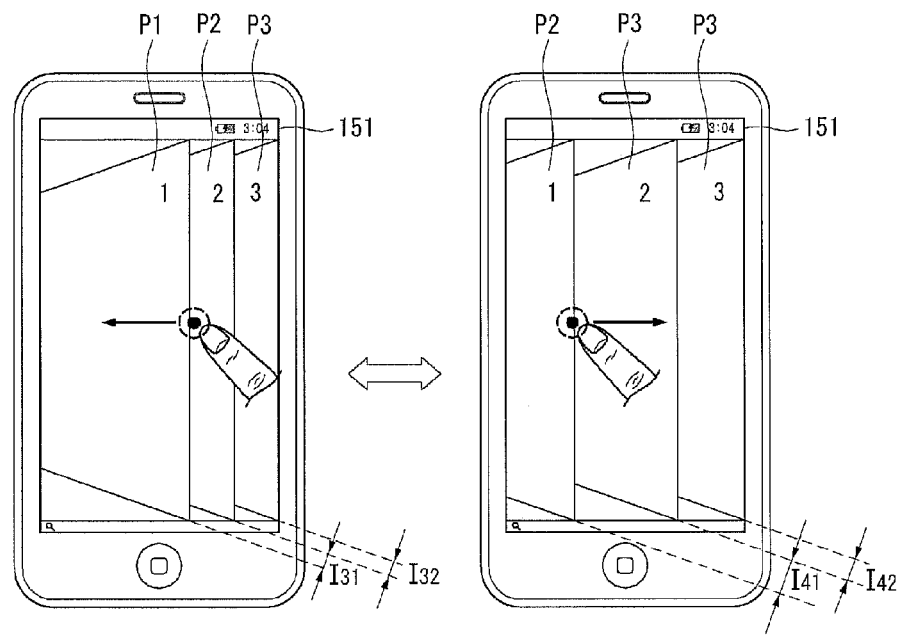

FIG. 17 is a flowchart illustrating a method of controlling a mobile terminal according to an embodiment of the present invention. FIGS. 18 to 19 are diagrams illustrating examples of changing a page arrangement characteristic in a state in which a plurality of pages are exposed on a touch screen according to an embodiment shown in FIG. 17.

Referring to FIG. 17, the controller 180 determines whether a plurality of pages are exposed on the touch screen 151 (S510), and if a plurality of pages are exposed on the touch screen 151, the controller 180 receives a predetermined touch input to a specific page of a plurality of pages (S520). Accordingly, the controller 180 controls to operate the mobile terminal 100 in a page editing mode (S530).

In the page editing mode, the controller 180 receives a gesture input of enlarging or narrowing a page gap (S540), and adjusts a page gap according to the gesture input (S550).

For example, referring to FIG. 18, as a long touch input to a first page P1 of a plurality of pages P1, P2, and P3 is received, the mobile terminal 100 enters a page editing mode. Further, when a touch input of dragging the first page P1 downward is received, a gap between the first page P1 and the second page P2 and a gap between the second page P2 and the third page P3 may be extended from 111 and 112 to 121 and 122, respectively.

In a state in which gaps between the pages are 121 and 122, when a touch input of dragging the first page P1 upward is received, the controller 180 reduces gaps between the pages from 121 and 122 to 111 and 112.

Further, FIG. 19 is a diagram illustrating an example of adjusting a page gap in a state in which a page is scrolled in a lateral direction on the touch screen 151. An example of a predetermined touch input of adjusting a page gap has been described in a foregoing description.

Figure 20A:
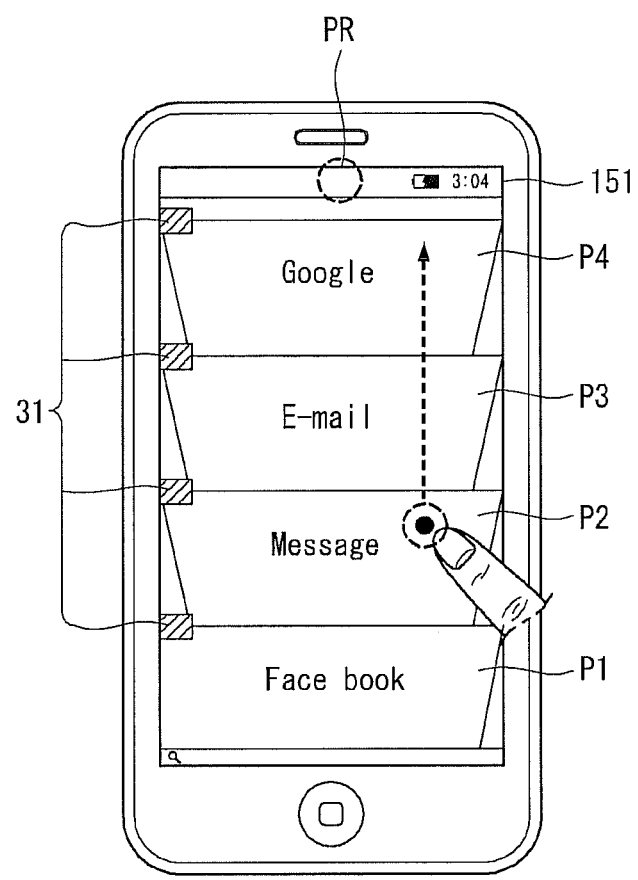
FIGS. 20A to 20B are diagrams illustrating another example of reconfiguring arrangement of a plurality of pages scrolled and exposed according to an embodiment of the present invention.
Figure 20B:
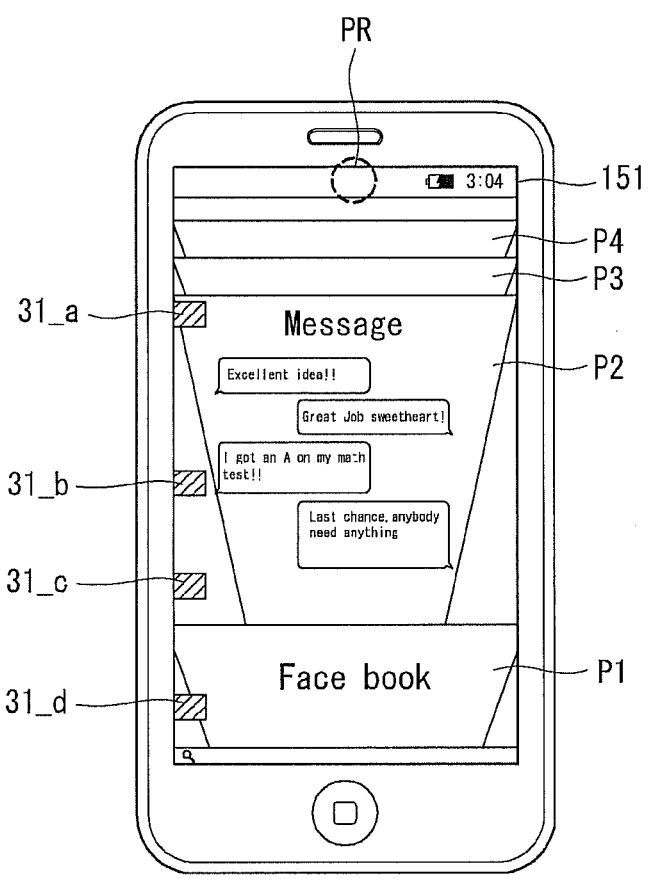

FIGS. 20A to 20B are diagrams illustrating another example of reconfiguring arrangement of a plurality of pages scrolled and exposed according to an embodiment of the present invention.

Referring to FIG. 20A, after a plurality of pages P1, P2, P3, and P4 are exposed on the touch screen 151 by a predetermined scroll operation, when the scroll operation is stopped, a bounce function is provided to each of the scrolled plurality of pages P1, P2, P3, and P4, and thus the plurality of pages P1, P2, P3, and P4 are returned to an original state.

For this, in a state in which the plurality of pages P1, P2, P3, and P4 are exposed on the touch screen 151 by the scroll operation, when the controller 180 receives a predetermined touch input (e.g., in a state in which a scroll operation is performed by a first finger, a touch input to the touch screen 151 by a second finger), the controller 180 controls to display fixed icons 31 for fixing each page in a scrolled state at a corresponding positions of each page.

In a state in which the fixed icon 31 is displayed, when an input of scrolling in a vertical direction is received, each page is scrolled while being hooked to each fixed icon 31.

In a state in which the fixed icons 31 are displayed, when a predetermined touch input is received, the fixed icons 31 may be removed from the touch screen 151.

Referring to FIG. 20B, in order to secure a wider visual field in a message page P2, the controller 180 receives a touch input of hooking the message page P2 to a first hook icon 31_a.

Accordingly, a page hooked to the first hook icon 31_a may include a message page P2, an e-mail page P3, and a Google page P4.

Therefore, as a user adjusts a page gap of a specific page of a plurality of pages exposed on the touch screen 151, a wider visual field can be secured in the specific page. Further, for this, at least one hook icons 31_a, 31_b, 31_c, and 31_d may be used.

In a mobile terminal according to an embodiment of the present invention, a reference that sequentially exposes a plurality of pages in response to a predetermined scroll operation to the touch screen 151 has been described with an attribute of a page presently displayed on the touch screen 151.

However, the mobile terminal 100 may sequentially scroll a plurality of pages unrelated to a page presently displayed on the touch screen 151 on the touch screen 151.

Figure 21:
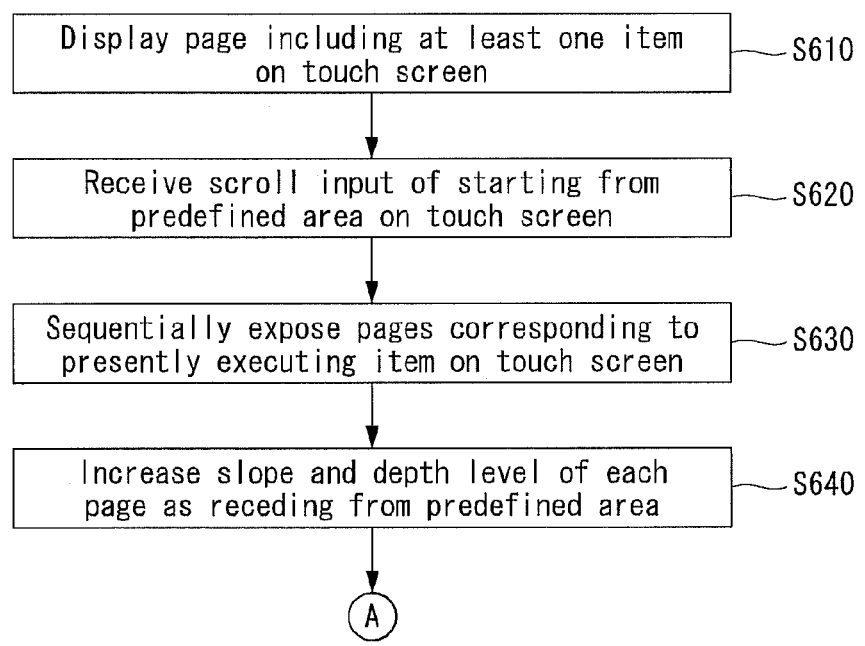
FIG. 21 is a flowchart illustrating a method of controlling a mobile terminal according to an embodiment of the present invention.
Figure 22:
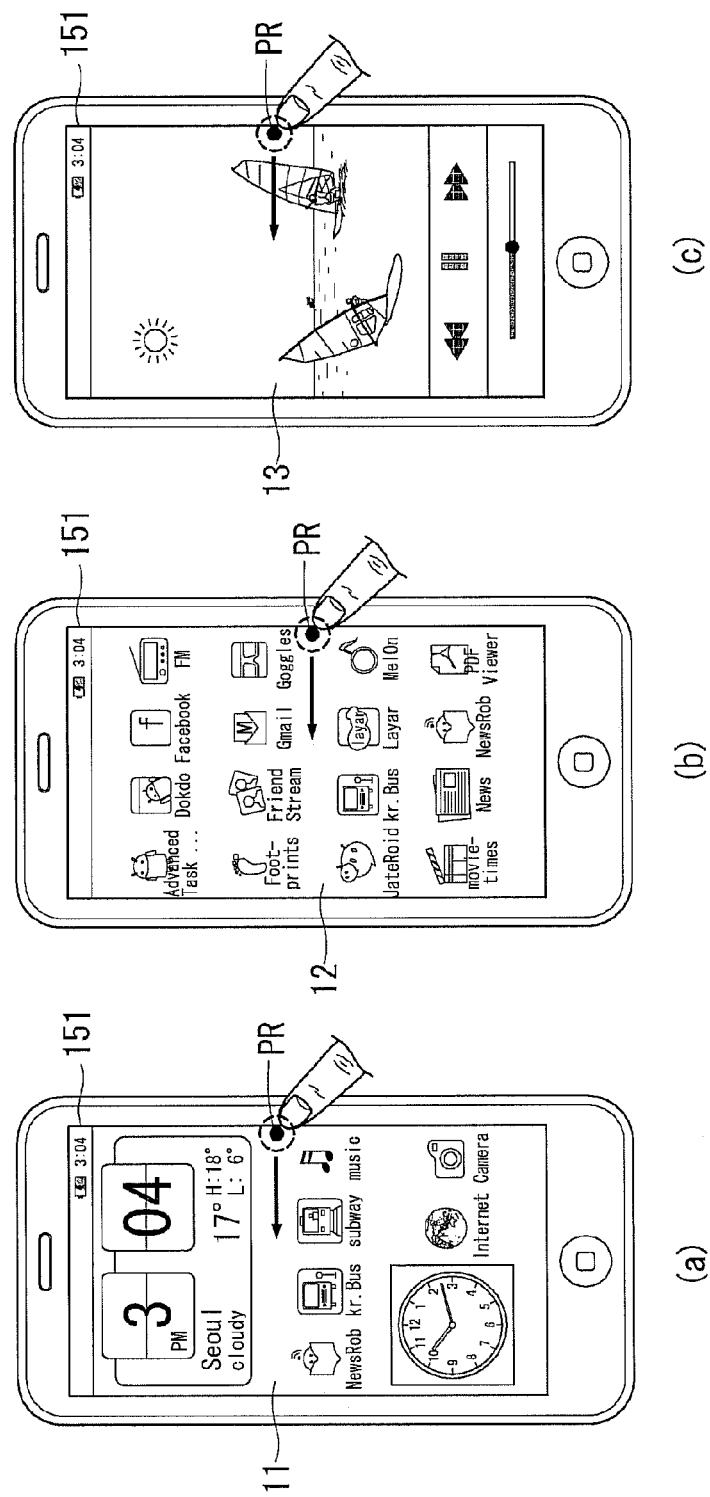
FIGS. 22 to 23 are diagrams illustrating examples of sequentially exposing and scrolling a page corresponding to a presently executing item on a touch screen according to an embodiment shown in FIG. 21.
Figure 23:
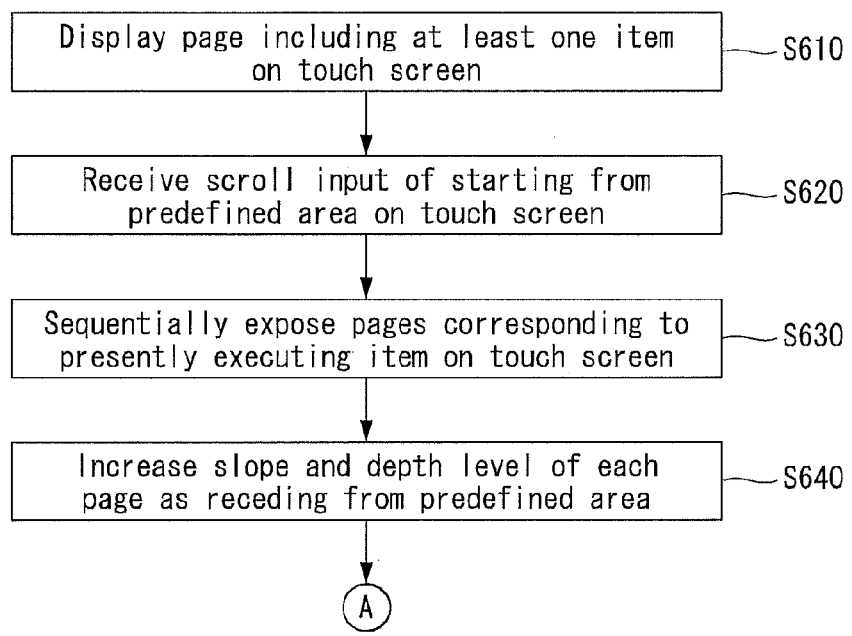

FIG. 21 is a flowchart illustrating a method of controlling a mobile terminal according to an embodiment of the present invention. FIGS. 22 to 23 are diagrams illustrating examples of sequentially exposing and scrolling pages corresponding to presently executing items on a touch screen according to an embodiment shown in FIG. 21.

Referring to FIG. 21, the controller 180 controls to display a page including at least one item on the touch screen 151 (S610).

The controller 180 receives a scroll input of starting from a predefined area on the touch screen (S620). Here, the predefined area may be a boundary surface of lateral side ends of the touch screen 151.

Therefore, referring to FIG. 22, the controller 180 receives a scroll input of moving to a left side direction from a predefined area (right side boundary surface) (PR) on the touch screen 151. Here, a page displayed on the touch screen 151 may include any one of a home screen 11, a screen 12 in which at least one application icon is displayed, and an execution screen 13 of a specific application.

Referring to FIG. 22, when a scroll input of moving from a predefined side end boundary surface PR of the touch screen 151 to a vertical direction of the boundary surface is received, a plurality of pages corresponding to presently executing items, respectively are scrolled while being sequentially exposed (S630), as shown in FIG. 23.

The controller 180 controls to increase and display a slope and a depth level of each page as receding from a predefined area (S640).

Here, the scrolled plurality of pages are pages corresponding to an application execution screen. Therefore, while at least one application is executed, when the mobile terminal 100 according to an embodiment of the present invention receives a scroll input of starting from predefined area of the touch screen 151, the mobile terminal 100 can scroll a plurality of pages P1, P2, and P3 corresponding to an execution screen of a plurality of presently executing applications by a multitask in a three-dimensional shape on the touch screen 151.

While at least one application is being presently executed, a predetermined event may occur in a specific application. In this case, the mobile terminal 100 according to an embodiment of the present invention displays whether an event occurs by changing a display characteristic of a page exposed on the touch screen 151.

Figure 24:
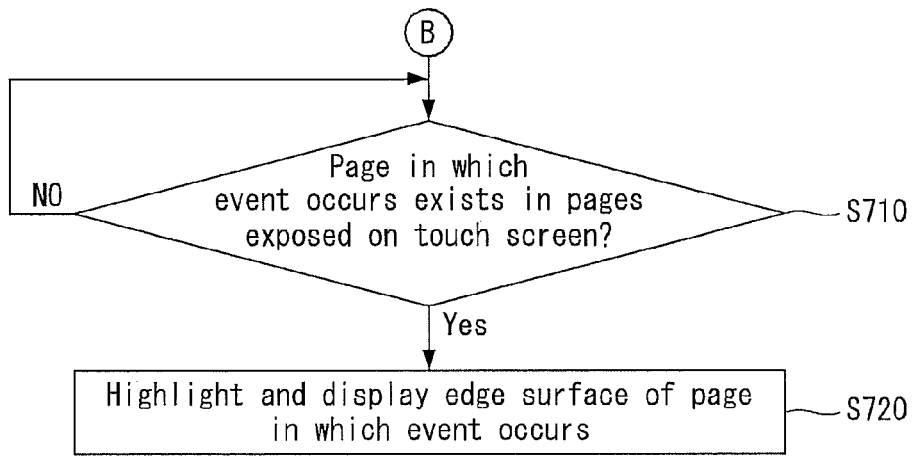
FIG. 24 is a flowchart illustrating a method of controlling a mobile terminal according to an embodiment of the present invention.
Figure 25A:
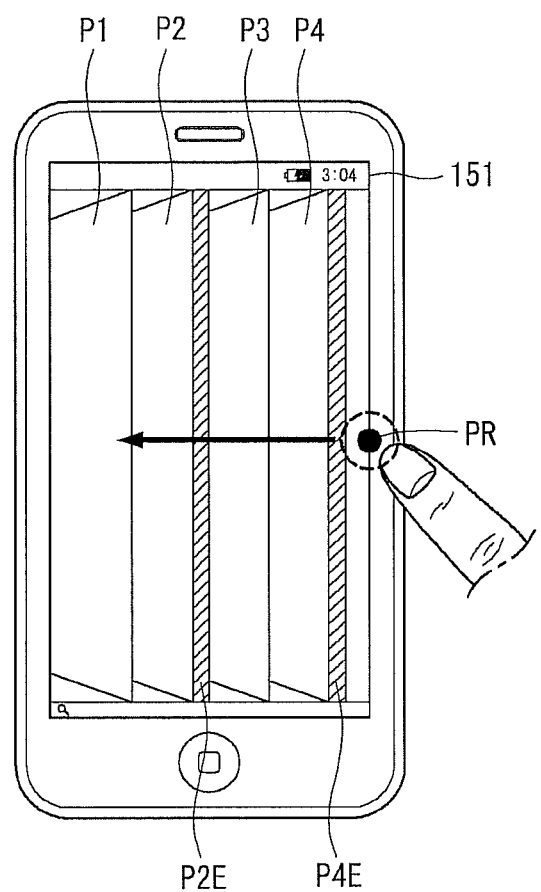
FIGS. 25A and 25B are diagrams illustrating examples of identifying a page in which an event occurs according to an embodiment shown in FIG. 24.
Figure 25B:
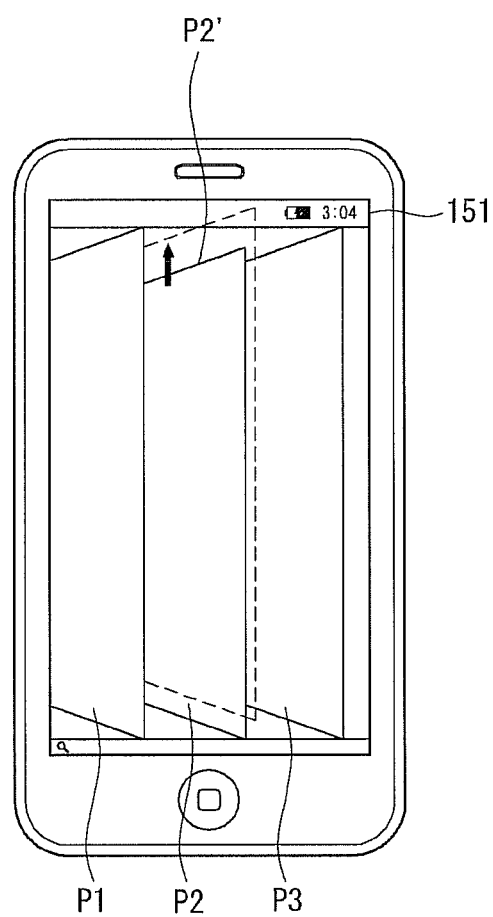

FIG. 24 is a flowchart illustrating a method of controlling a mobile terminal according to an embodiment of the present invention. FIGS. 25A and 25B are diagrams illustrating examples of identifying a page in which an event occurs according to an embodiment shown in FIG. 24.

The controller 180 determines whether a page in which an event occurs exists in a plurality of pages exposed on the touch screen 151 (S710).

In order to easily determine whether an event occurs, the controller 180 controls to change and display a display characteristic of a page in which an event occurs (S720).

For example, referring to FIG. 25A, in a state in which a plurality of pages P1, P2, P3, and P4 are exposed on the touch screen 151, when a predetermined event occurs in an item corresponding to each of the second page P2 and the fourth page P4, the controller 180 controls to highlight and display an edge area P2E of a second page and an edge area P4E of a fourth page.

Further, for example, referring to FIG. 25B, by moving a page P2 corresponding to an item in which an event occurs in a vertical upper direction P2' or a vertical low direction, the controller 180 controls to distinguishably display the page P2 from pages P1 and P3 in which an event does not occur.

When a predetermined user manipulation is input to a plurality of pages displayed on the touch screen 151, the controller 180 reconfigures pages in which an event occurs in a plurality of pages.

Figure 26:
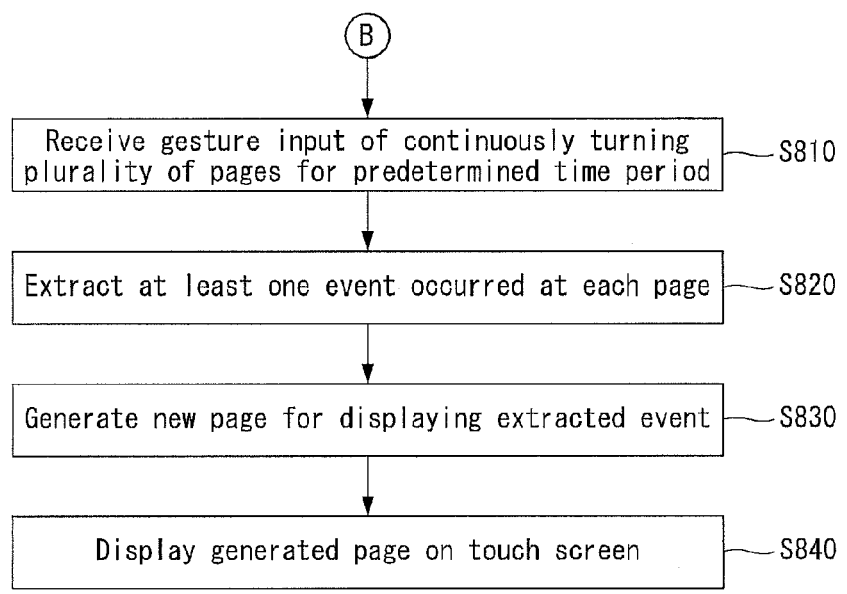
FIG. 26 is a flowchart illustrating a method of controlling a mobile terminal according to an embodiment of the present invention.
Figure 27A:
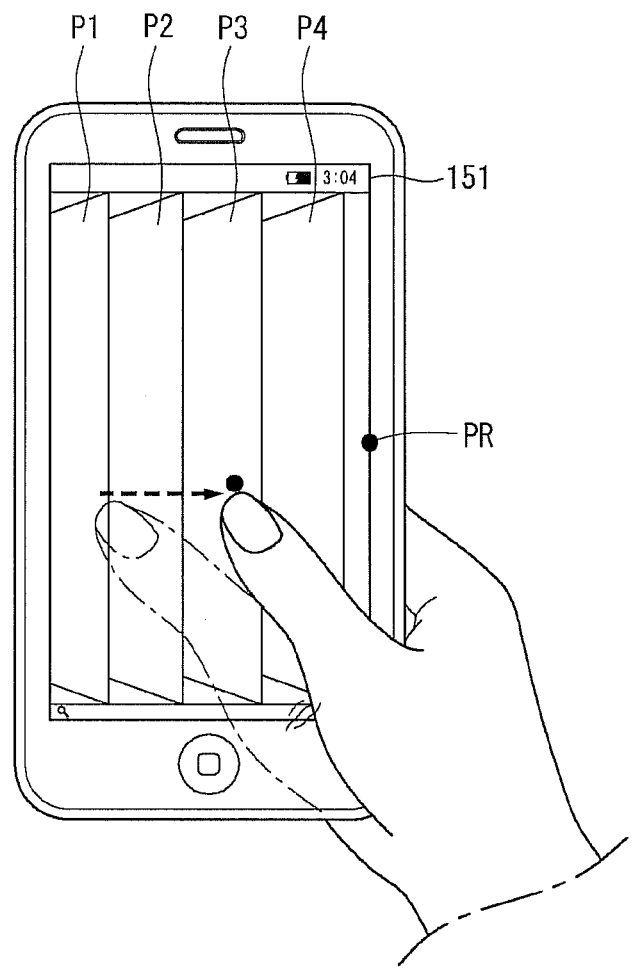
Figure 27B:
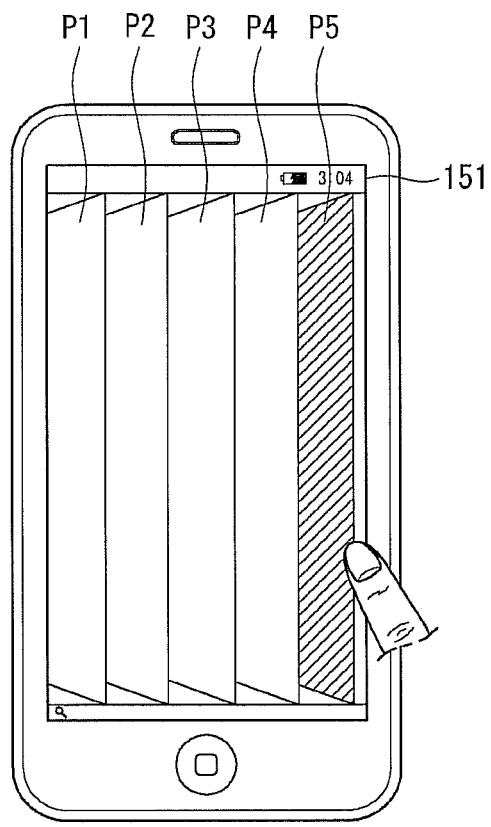

FIG. 26 is a flowchart illustrating a method of controlling a mobile terminal according to an embodiment of the present invention. FIGS. 27A to 27C are diagrams illustrating an example of reconfiguring an event occurred in a plurality of pages according to an embodiment shown in FIG. 26.

Referring to FIG. 26, the controller 180 determines whether a page in which an event occurs exists in a plurality of pages exposed on the touch screen 151 and receives a gesture input of continuously turning the plurality of pages for a predetermined time period (S810).

For example, referring to FIG. 27A, a touch input of turning a plurality of pages P1, P2, P3, and P4 from the first page P1 to the fourth page P4 as sequentially turning pages of a book may be received.

Thereafter, the controller 180 extracts at least one event occurred at each page (S820), generates a new page for displaying the extracted event (S830), and controls to display the new page on the touch screen 151 (S840).

For example, referring to FIG. 27B, a new page P5 may be generated and displayed together with a previously displayed plurality of pages P1, P2, P3, and P4.

Further, for example, referring to FIG. 27C, the new page P5 for displaying generated event lists 21, 22, and 23 may be displayed in an entire surface of the touch screen 151.

In the foregoing embodiment, when a scroll input of starting from a predetermined area of the touch screen 151 is received, various examples of providing a three-dimensional effect while sequentially exposing a plurality of pages in a scroll direction and examples of controlling execution of each page in a state in which the plurality of pages are exposed and at least one item included in each page have been described.

Hereinafter, after the scroll input is terminated, an example of returning a plurality of scrolled pages to a state before scrolling will be described.

Figure 28:
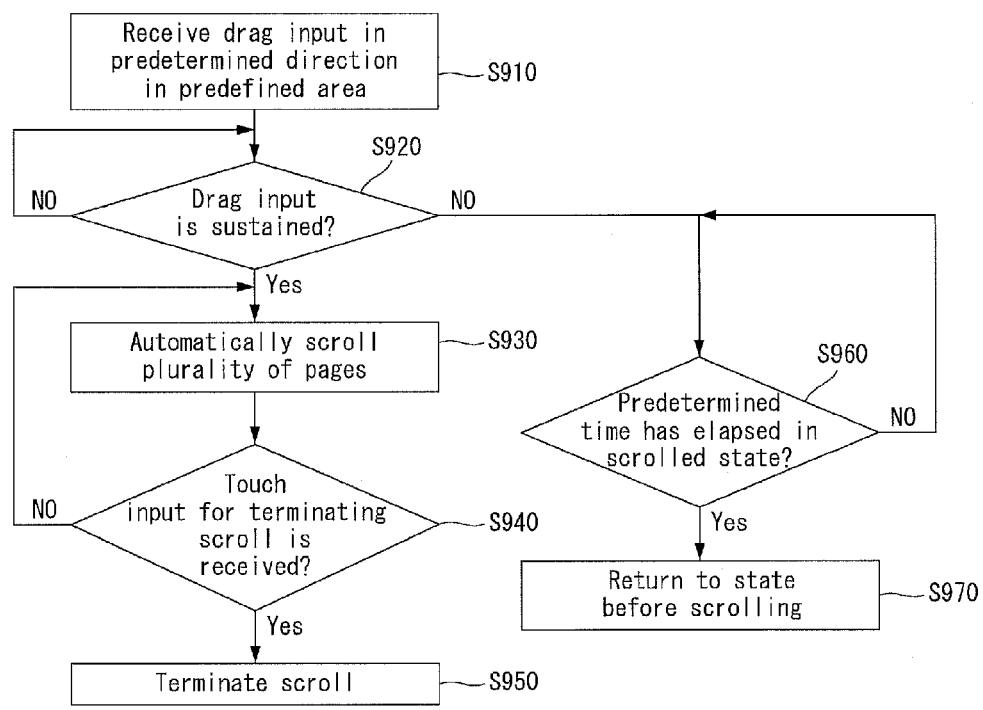
FIG. 28 is a flowchart illustrating a method of controlling a mobile terminal according to an embodiment of the present invention.
Figure 29:
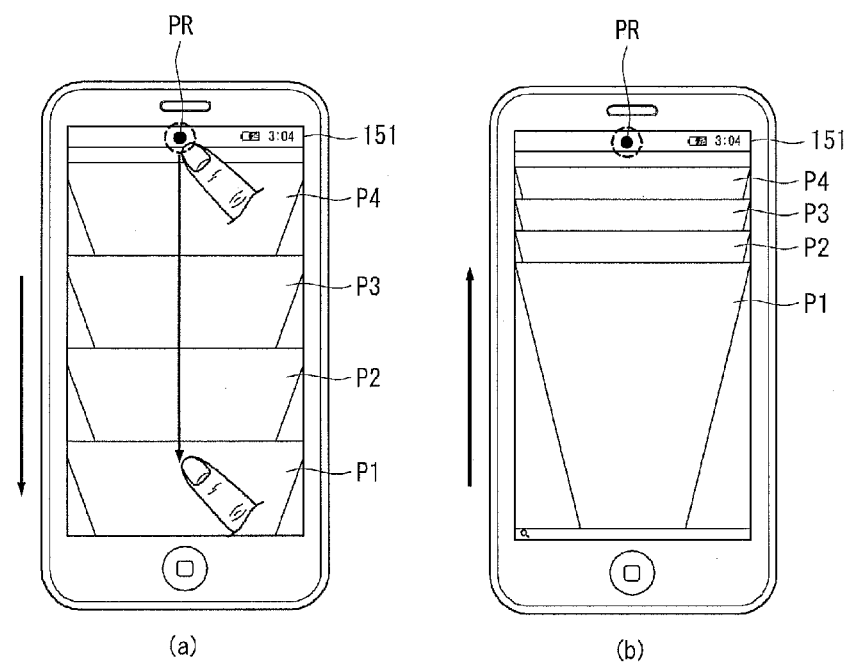
FIG. 29 is a diagram illustrating an example of returning a plurality of pages scrolled and exposed according to an embodiment shown in FIG. 28 to an original state.

FIG. 28 is a flowchart illustrating a method of controlling a mobile terminal according to an embodiment of the present invention. FIG. 29 is a diagram illustrating an example of returning a plurality of pages scrolled and exposed according to an embodiment shown in FIG. 28 to an original state.

Referring to FIG. 28, the controller 180 receives a drag input in a predetermined direction in a predefined area (S910).

The controller 180 determines whether a touch input to a location at which a drag input is terminated is sustained at a time point in which the drag input is terminated (S920), and if a touch input to a location at which a drag input is terminated is sustained at a time point in which the drag input is terminated, the controller 180 automatically scrolls the plurality of pages (S930).

Thereafter, the controller 180 determines whether a touch input of terminating scroll of the plurality of pages is received (S940), and if a touch input of terminating scroll of the plurality of pages is received, the controller 180 terminates a page scroll (S950). Here, a touch input of terminating the page scroll may be a touch input in a second direction by a second finger while performing a scroll operation in a first direction by a first finger. For example, while a vertical downward scroll input is performed by the first finger, when a drag input of the scroll direction and vertical direction by the second finger is received, a scroll operation may be terminated.

If a touch input to a location at which a drag input is terminated is not sustained at a time point in which the drag input is terminated at step S920, the controller 180 determines whether a predetermined time has elapsed in a scrolled state (S960). If a predetermined time has elapsed in a scrolled state, the controller 180 returns a plurality of pages to a state before scrolling (S970).

Referring to FIG. 29A, while a predetermined drag input is sustained, a plurality of pages P1, P2, P3, and P4 may be automatically scrolled.

After a touch input is released, if a predetermined time has elapsed, the controller 180 returns a plurality of pages P1, P2, P3, and P4 to a state before scrolling, as shown in FIG. 29B.

The above-described method of controlling a mobile terminal according to the present invention may be written and provided in a computer readable recording medium with a program to execute in a computer.

The method of controlling the mobile terminal according to the present invention may be executed through software. When executed with the software, constituent means of the present invention are code segments that perform required tasks. Programs or code segments may be stored in a processor readable medium or may be transmitted by a computer data signal combined with a carrier through a transmission medium or a communication network.

The computer readable recording medium may be any data storage device for storing data that can be read by a computer system. The computer readable recording medium may include, for example, a ROM, a RAM, a CD-ROM, a DVD+ROM, a DVD-RAM, a magnetic tape, a floppy disk, a hard disk, and an optical data storage device. The computer readable recording medium may also be distributed in a computer system connected to a network and thus a computer readable code may be stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

DESCRIPTION OF REFERENCE NUMERALS

100: mobile terminal
151: touch screen (display unit)
180: controller

What is claimed is:

1. A mobile terminal comprising:
   a touch screen configured to receive touch inputs and display at least one web page; and
   a controller operatively connected to the touch screen and configured to
      display a representative web page on the touch screen, wherein the representative web page is one among a plurality of web pages and each of the plurality of web pages includes a top side, a bottom side, a left side and a right side,
      display the plurality of web pages in a parallel and layered state in response to receiving a touch and drag input on an identifier area of the representative web page,
      sequentially slide the plurality of web pages according to the drag input in a layered sequence of the plurality of web pages so that a top page of the plurality of web pages moves in a direction of the drag input and each of the plurality of web pages under the top page is revealed to increase an amount that is displayed,
      set a separation gap between one of the plurality of web pages and an adjacent web page overlapping the one web page according to a second touch input on the one web page to increase the separation gap by an amount set by a user, the separation gap being increased to increase an amount of the one web page that is displayed while at least a portion of each of the plurality of web pages is displayed, wherein at least one of the one web page or the adjacent web page is stationary while the other is moved by the second touch input while in the overlapped state to increase the separation gap, and wherein the separation gap is a distance between the top side of the one web page and the top side of the adjacent web page,
      display fixed icons on corresponding positions of the plurality of web pages in response to consequently receiving a touch input on a specific area while the plurality of web pages are being slid with the drag input, and
      slide the plurality of web pages to a next fixed icon when the drag input is received in a state in which the fixed icons are displayed, regardless of a distance of the drag input,
      wherein the controller is configured to adjust the separation gap by enlarging or narrowing the separation gap between the one web page and the adjacent web page according to the second touch input.

2. The mobile terminal of claim 1, wherein a width of the bottom side of the each of the plurality of web pages is changed to be smaller than a width of the top side of each of the plurality of web pages based on a distance of the drag input.

3. The mobile terminal of claim 2, wherein the controller is further configured to change a number of the displayed plurality of web pages according to the distance of the drag input.

4. The mobile terminal of claim 1, wherein the controller is further configured to display a specific web page as the representative web page when a touch input for selecting the specific web page of the plurality of web pages is received.

5. The mobile terminal of claim 1, wherein the identifier area of the web page is provided at the top side of the representative web page.

6. The mobile terminal of claim 1, wherein the drag direction of the drag input is toward the bottom side of the web page toward an inside of the touch screen.

7. The mobile terminal of claim 1, wherein a width of the top side of the web page does not change while the width of the bottom side becomes smaller when the plurality of web pages sequentially slide.

8. A method of controlling a mobile terminal, the method comprising:
   displaying a representative web page on a touch screen configured to receive touch inputs;
   displaying the representative web page on the touch screen, wherein the representative web page is one among a plurality of web pages and each of the plurality of web pages includes a top side, a bottom side, a left side and a right side, displaying the plurality of web pages in a parallel and layered state in response to receiving a touch and drag input on an identifier area of the representative web page;

sequentially sliding the plurality of web pages according to the drag input in a layered sequence of the plurality of web pages so that a top page of the plurality of web pages moves in a direction of the drag input and each of the plurality of web pages under the top page is revealed to increase an amount that is displayed;

setting a separation gap between one of the plurality of web pages and an adjacent web page overlapping the one web page according to a second touch input on the one web page to increase the separation gap by an amount set by a user, the separation gap being increased to increase an amount of the one web page that is displayed while at least a portion of each of the plurality of web pages is displayed, wherein at least one of the one web page or the adjacent web page is stationary while the other is moved while in the overlapped state to increase the separation gap, and wherein the separation gap is a distance between the top side of the one web page and the top side of the adjacent web page, displaying fixed icons on corresponding positions of the plurality of web pages in response to consequently receiving a touch input on a specific area while the plurality of web pages are being slid with the drag input; and sliding the plurality of web pages to a next fixed icon when the drag input is received in a state in which the fixed icons are displayed, regardless of a distance of the drag input, wherein the separation gap is adjusted by enlarging or narrowing the separation gap between the one web page and the adjacent web page according to the second touch input.

* * * * *